(12) United States Patent
Kashiwagi et al.

(10) Patent No.: US 8,277,927 B2
(45) Date of Patent: Oct. 2, 2012

(54) ELECTRET AND ELECTROSTATIC INDUCTION CONVERSION DEVICE

(75) Inventors: Kimiaki Kashiwagi, Tokyo (JP); Kuniko Okano, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/904,856

(22) Filed: Oct. 14, 2010

(65) Prior Publication Data
US 2011/0031845 A1 Feb. 10, 2011

Related U.S. Application Data

(63) Continuation of application No. PCT/JP2009/057656, filed on Apr. 16, 2009.

(30) Foreign Application Priority Data

Apr. 17, 2008 (JP) .................................. 2008-107717

(51) Int. Cl.
| | |
|---|---|
| B32B 27/30 | (2006.01) |
| B32B 27/32 | (2006.01) |
| B32B 27/34 | (2006.01) |
| B32B 27/36 | (2006.01) |
| B32B 27/38 | (2006.01) |
| B32B 7/00 | (2006.01) |
| B32B 27/08 | (2006.01) |
| B32B 27/42 | (2006.01) |
| G11C 13/02 | (2006.01) |

(52) U.S. Cl. ........ 428/216; 428/212; 428/213; 428/412; 428/413; 428/414; 428/421; 428/422; 428/423.1; 428/424.2; 428/424.6; 428/473.5; 428/474.7; 428/476.3; 428/480; 428/483; 428/515; 428/516; 428/518; 428/520; 428/522; 428/523; 428/704; 307/400

(58) Field of Classification Search ..................... None
See application file for complete search history.

(56) References Cited

U.S. PATENT DOCUMENTS

| | | | | |
|---|---|---|---|---|
| 3,702,493 | A | * | 11/1972 | Murphy ....................... 29/592.1 |
| 3,946,422 | A | * | 3/1976 | Yagi et al. ...................... 257/254 |
| 3,967,027 | A | * | 6/1976 | Igarashi et al. ............... 428/212 |
| 4,250,415 | A | * | 2/1981 | Lewiner et al. ............... 307/400 |
| 4,291,245 | A | * | 9/1981 | Nowlin et al. ................ 307/400 |

(Continued)

FOREIGN PATENT DOCUMENTS

EP 0 369 032 A1 5/1990

(Continued)

OTHER PUBLICATIONS

International Search Report mailed Jun. 16, 2009 in International Application No. PCT/JP2009/057656.

(Continued)

*Primary Examiner* — Vivian Chen
(74) *Attorney, Agent, or Firm* — Foley & Lardner LLP

(57) ABSTRACT

An electret in disclosed including a laminate. A layer (A) containing a resin (a) and a layer (B) containing a resin (b) other than the resin (a) or an inorganic substance (c) are directly laminated. The resin (a) is a fluororesin (a1), or a resin (a2) having an alicyclic structure and containing no fluorine atom. The layer (B) is disposed on the outermost surface on a side opposite to the side where electric charge is injected at the time of injecting electric charge into the laminate to form the electret.

7 Claims, 1 Drawing Sheet

U.S. PATENT DOCUMENTS

| | | | |
|---|---|---|---|
| 4,441,038 A | | 4/1984 | Tanaka et al. |
| 4,442,324 A * | | 4/1984 | Blanchard et al. ............ 381/173 |
| 4,443,711 A | | 4/1984 | Tanaka et al. |
| 4,513,049 A | | 4/1985 | Yamasaki et al. |
| 5,161,233 A * | | 11/1992 | Matsuo et al. ................. 399/136 |
| 5,256,176 A | | 10/1993 | Matsuura et al. |
| 5,267,076 A | | 11/1993 | Broussoux et al. |
| 5,284,692 A * | | 2/1994 | Bell ................................ 428/69 |
| 5,439,768 A * | | 8/1995 | Matsuo et al. .................. 430/56 |
| 5,558,809 A * | | 9/1996 | Groh et al. ................. 252/62.54 |
| 5,610,455 A * | | 3/1997 | Allen et al. ................... 307/400 |
| 5,638,103 A | | 6/1997 | Obata et al. |
| 5,731,116 A | | 3/1998 | Matsuo et al. |
| 5,759,205 A * | | 6/1998 | Valentini ....................... 433/173 |
| 5,787,327 A * | | 7/1998 | Matsushita et al. ........... 399/130 |
| 5,981,123 A | | 11/1999 | Matsuo et al. |
| 6,221,987 B1 * | | 4/2001 | Sugiyama ..................... 526/231 |
| 6,489,033 B1 * | | 12/2002 | Hatke et al. ................... 428/461 |
| 6,493,013 B2 | | 12/2002 | Obata et al. |
| 6,573,205 B1 * | | 6/2003 | Myers et al. .................. 442/414 |
| 6,806,593 B2 * | | 10/2004 | Tai et al. ....................... 307/400 |
| 6,833,687 B2 * | | 12/2004 | Landolt ......................... 320/166 |
| 6,870,939 B2 * | | 3/2005 | Chiang et al. ................. 381/175 |
| 6,893,990 B2 | | 5/2005 | Myers et al. |
| 7,449,811 B2 * | | 11/2008 | Suzuki et al. ................. 310/309 |
| 7,879,446 B2 * | | 2/2011 | Liu et al. ....................... 428/421 |
| 2002/0080684 A1 | | 6/2002 | Donskoy et al. |
| 2005/0009944 A1 | | 1/2005 | Apostolo et al. |
| 2005/0107555 A1 * | | 5/2005 | Chiang et al. ................. 526/255 |
| 2006/0113862 A1 | | 6/2006 | Suzuki et al. |
| 2008/0111444 A1 | | 5/2008 | Mabuchi |
| 2008/0122313 A1 | | 5/2008 | Mabuchi et al. |
| 2009/0051242 A1 | | 2/2009 | Suzuki et al. |
| 2009/0245547 A1 | | 10/2009 | Lee et al. |
| 2010/0127595 A1 | | 5/2010 | Suzuki et al. |
| 2011/0012438 A1 * | | 1/2011 | Kashiwagi et al. ........... 307/400 |
| 2011/0166299 A1 * | | 7/2011 | Kashiwagi .................... 525/381 |

FOREIGN PATENT DOCUMENTS

| | | |
|---|---|---|
| EP | 0 460 523 A1 | 12/1991 |
| EP | 0 950 672 A1 | 10/1999 |
| EP | 0 969 023 A2 | 1/2000 |
| EP | 2 266 792 A1 | 12/2010 |
| GB | 2 079 056 A | 1/1982 |
| JP | 64-041865 A | 2/1989 |
| JP | 03-156375 A | 7/1991 |
| JP | 04-255716 A | 9/1992 |
| JP | 08-015302 A | 1/1996 |
| JP | 8-41260 | 2/1996 |
| JP | 08-041260 * | 2/1996 |
| JP | 08-155230 A | 6/1996 |
| JP | 2002-505034 | 2/2002 |
| JP | 2003-013359 A | 1/2003 |
| JP | 2004-059763 A | 2/2004 |
| JP | 2004-128361 * | 4/2004 |
| JP | 2006-180450 | 7/2006 |
| JP | 2006-253847 A | 9/2006 |
| JP | 2006-329800 A | 12/2006 |
| JP | 2007-292743 A | 11/2007 |
| JP | 2007-312551 A | 11/2007 |
| JP | 2007-333618 A | 12/2007 |
| JP | 2008-010176 A | 1/2008 |
| JP | 2008-016919 A | 1/2008 |
| JP | 2008-028499 A | 2/2008 |
| JP | 2008-167231 A | 7/2008 |
| JP | 2008-266563 A | 11/2008 |
| JP | 2009-017769 A | 1/2009 |
| WO | WO 98/56836 | 12/1998 |
| WO | WO-2007/044921 A1 | 4/2007 |
| WO | WO-2008/114489 A1 | 9/2008 |
| WO | WO-2008/133088 A1 | 11/2008 |

OTHER PUBLICATIONS

U.S. Appl. No. 13/049,833, filed Mar. 16, 2011, Kashiwagi et al.
U.S. Appl. No. 12/894,097, filed Sep. 29, 2010, Hamatani et al.
U.S. Appl. No. 12/805,234, filed Jul. 20, 2010, Kashiwagi.
U.S. Appl. No. 12/890,441, filed Sep. 24, 2010, Kashiwagi et al.
Arakawa et al., "Micro Seismic Power Generator Using Electret Polymer Film," The 9th National Symposium on Power and Energy Systems (SPES 2004), Jun. 22, 2004, pp. 37-38.
Chapter 3 "Vision for the future of the ubiquitous sensor network" in "The final report for a realization of the ubiquitous sensor network", Ministry of Internal Affairs and Communications, Sep. 2004, Internet: http://www.soumu.go.jp/s-news/2004/040806__4_b2.html, accessed on Mar. 6, 2008.
International Search Report in PCT/JP2009/055979.
International Search Report in PCT/JP2009/066181.
International Search Report in PCT/JP2009/052932.
International Search Report in PCT/JP2009/056175.
Supplementary European Search Report dated Aug. 2, 2011 in EP 09711771.7.
Supplementary European Search Report dated Jul. 27, 2011, in EP 09724065.9.
Supplementary European Search Report dated Jul. 28, 2011, in EP 09732621.9.

* cited by examiner

ELECTRET AND ELECTROSTATIC INDUCTION CONVERSION DEVICE This application is a continuation of PCT/JP2009/057656, filed Apr. 16, 2009.

TECHNICAL FIELD

The present invention relates to an electret and an electrostatic induction conversion device comprising such an electret.

BACKGROUND ART

Heretofore, an electrostatic induction conversion device such as a power-generating unit or a microphone has been proposed wherein an electret having an electric charge injected to an insulating material, is used.

As the material for such an electret, it has been common to use a chain structure resin such as polycarbonate, polypropylene or polytetrafluoroethylene. Further, recently, it has been proposed to use a polymer having a fluoroalicyclic structure in its main chain (e.g. Patent Document 1), or a cycloolefin polymer (e.g. Patent Documents 2 and 3), as the material for such an electret.

PRIOR ART DOCUMENTS

Patent Documents

Patent Document 1: JP-A-2006-180450
Patent Document 2: JP-A-2002-505034
Patent Document 3: JP-A-8-41260

DISCLOSURE OF THE INVENTION

Object to be Accomplished by the Invention

With respect to an electret, it is necessary to maintain the surface voltage of the electret in order to improve the conversion efficiency between electrical energy and kinetic energy in an electrostatic induction conversion device employing such an electret. For such a purpose, a material to be used for the electret is required to be formed into a film having a thickness of at least a certain level. However, in a case where film forming is carried out, for example, by a wet process, in order to form the film to be thick, it was required to increase the concentration of the solution, which tended to cause non-uniformity in the film thickness. Further, also in a case where film forming was carried out by a dry process, it was necessary to repeat the film-forming step, whereby there was a problem that it took a long time for the process.

The present invention has been made in view of such problems, and it is an object of the present invention to provide an electret having a high surface voltage and an electrostatic induction conversion device comprising such an electret.

Means to Accomplish the Object

A first embodiment of the present invention to accomplish the above object is an electret comprising a laminate wherein a layer (A) containing a resin (a) and a layer (B) containing a resin (b) other than the resin (a) or an inorganic substance (c) are directly laminated, wherein the resin (a) is a fluororesin (a1), or a resin (a2) having an alicyclic structure and containing no fluorine atom; and the layer (B) is disposed on the outermost surface on a side opposite to the side where electric charge is injected at the time of injecting electric charge into the laminate to form the electret.

A second embodiment of the present invention is an electrostatic induction conversion device comprising the electret of the first embodiment.

Advantageous Effects of the Invention

According to the present invention, it is possible to provide an electret having a high surface voltage and a process for its production as well as an electrostatic induction conversion device comprising such an electret, whereby the conversion efficiency between electrical energy and kinetic energy is improved.

MODE FOR CARRYING OUT THE INVENTION

Figure 1:
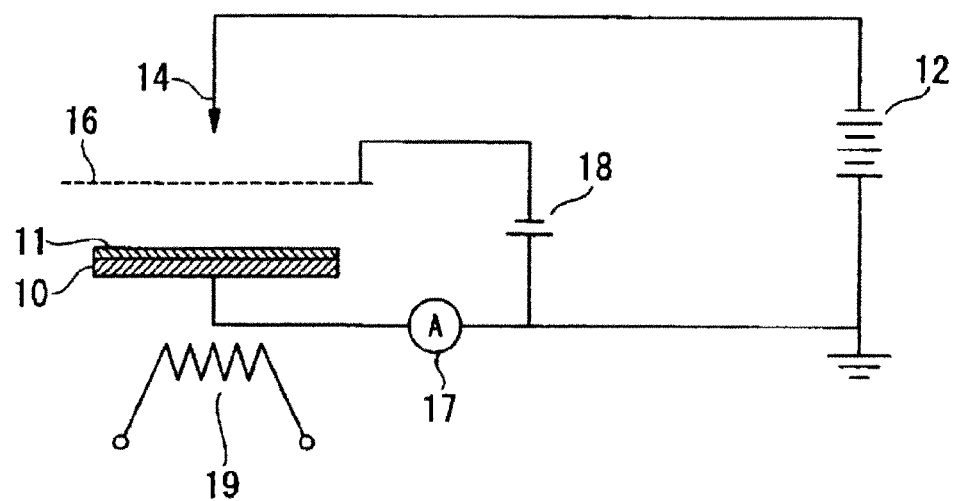
FIG. 1 is a schematic diagram illustrating a corona charging equipment used for injection of electric charge.

Now, the best mode for carrying out the present invention will be described.

In the following specification, "repeating units" constituting a polymer may be referred to simply as "units".

Further, a monomer represented by the formula (1) may be referred to also as "a monomer (1)". A unit, compound or the like represented by another formula will be referred to in a similar manner, and for example, a unit represented by the formula (z1) may be referred to also as "a unit (z1)".

The electret of the present invention is characterized in that it comprises a laminate wherein the following layers (A) and (B) are directly laminated. In such a laminate, the layer (B) is disposed on the outermost surface on a side opposite to the side where electric charge is injected at the time of injecting electric charge into the laminate to form an electret.

Layer (A): a layer containing a resin (a).

Layer (B): a layer containing a resin (b) other than the resin (a), or an inorganic substance (c).

The layer (A) is a portion which plays a role for charge retention as an electret, and the layer (B) is in contact directly with the layer (A) so as to contribute to the improvement of the surface charge density.

<Layer (A)>

The layer (A) is constituted by a resin (a) which is a fluororesin (a1), or a resin (a2) having an alicyclic structure and containing no fluorine atom. Each of the fluororesin (a1) and the resin (a2) is excellent in the charge retention performance.

The "alicyclic structure" means a cyclic structure having no aromatic nature. The alicyclic structure may, for example, be a saturated or unsaturated hydrocarbon cyclic structure which may have a substituent, or a heterocyclic structure having some of carbon atoms in such a hydrocarbon cyclic structure substituted by hetero atoms such as oxygen atoms or nitrogen atoms.

Since the layer (A) is a portion which plays a role for charge retention as an electret, as the resin (a), one having a high volume resistivity and a high dielectric breakdown voltage is preferably employed.

The volume resistivity of the resin (a) is preferably from $10^{10}$ to $10^{20}$ $\Omega$cm, more preferably from $10^{16}$ to $10^{19}$ $\Omega$cm. The volume resistivity is measured by a method in accordance with ASTM D257.

Further, the dielectric breakdown voltage of the resin (a) is preferably from 10 to 25 kV/mm, more preferably from 15 to 22 kV/mm. The dielectric breakdown voltage is measured by a method in accordance with ASTM D149.

The resin (a1)) is not particularly limited, and for example, it may optionally be selected from fluororesins which have been used for electrets. Such fluororesins are excellent in electrical insulation properties and also excellent in electric charge retention performance as electrets.

Specific examples of the resin (a1)) may, for example, be a polytetrafluoroethylene (PTFE), a tetrafluoroethylene/hexafluoropropylene copolymer (FEP), an ethylene/tetrafluoroethylene copolymer (ETFE), a tetrafluoroethylene/perfluoro(alkyl vinyl ether) copolymer (PFA), a fluoroolefin/alkyl vinyl ether copolymer, a polyvinylidene fluoride or a fluorinated cyclic polymer. Among them, from the viewpoint of electrical insulation properties, at least one member selected from the group consisting of PTFE, FEP, PFA and a fluorinated resin having an alicyclic structure, is preferred.

As the fluororesin (a1) a fluororesin having an alicyclic structure (e.g. the after-mentioned fluorinated cyclic polymer) is more preferred. Here, the fluororesin having an alicyclic structure is meant for a fluororesin having the above "alicyclic structure" wherein hydrogen atoms in a hydrocarbon cyclic structure or a heterocyclic structure are substituted by fluorine atoms.

The "fluorinated cyclic polymer" is a fluoropolymer having a fluorinated alicyclic structure in the main chain and is meant for one wherein at least one of carbon atoms constituting the fluorinated alicyclic structure is a carbon atom constituting the main chain of the fluoropolymer.

Among carbon atoms constituting the fluorinated alicyclic structure, a carbon atom constituting the main chain is derived from the polymerizable double bond of a monomer for the units constituting the fluoropolymer.

For example, in a case where the fluoropolymer is a fluoropolymer obtained by polymerizing a cyclic monomer as described hereinafter, two carbon atoms constituting the double bond become the carbon atoms constituting the main chain.

Further, in the case of a fluoropolymer obtained by cyclopolymerizing a monomer having two polymerizable double bonds, at least two among the four carbon atoms constituting the two polymerizable double bonds become the carbon atoms constituting the main chain.

The fluorinated alicyclic structure may be one wherein the cyclic skeleton is constituted solely by carbon atoms, or a heterocyclic structure wherein a hetero atom such as an oxygen atom or a nitrogen atom is contained in addition to the carbon atoms. The fluorinated alicyclic ring is preferably a fluorinated alicyclic ring having one or two etheric oxygen atoms in the cyclic skeleton.

The number of atoms constituting the cyclic skeleton of the fluorinated alicyclic structure is preferably from 4 to 7, more preferably from 5 to 6. That is, the fluorinated alicyclic structure is preferably a 4- to 7-membered ring, more preferably a 5- or 6-membered ring.

As a preferred fluorinated cyclic polymer, the following fluorinated cyclic polymer (I') or fluorinated cyclic polymer (II') may be mentioned.

Fluorinated cyclic polymer (I'): a polymer having a unit based on a cyclic fluorinated monomer.

Fluorinated cyclic polymer (II'): a polymer having a unit formed by cyclopolymerization of a diene type fluorinated monomer.

The "cyclic fluorinated monomer" is a monomer having a polymerizable double bond between carbon atoms constituting a fluorinated alicyclic ring, or a monomer having a polymerizable double bond between a carbon atom constituting a fluorinated alicyclic ring and a carbon atom of other than a fluorinated alicyclic ring.

Such a cyclic fluoromonomer is preferably a compound (1) or a compound (2).

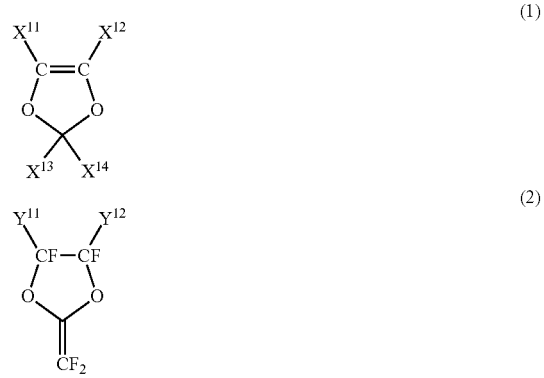

In the above formulae, each of $X^{11}$, $X^{12}$, $X^{13}$, $X^{14}$, $Y^{11}$ and $Y^{12}$ which are independent of one another, is a fluorine atom, a perfluoroalkyl group or a perfluoroalkoxy group.

The perfluoroalkyl group for $X^{11}$, $X^{12}$, $X^{13}$, $X^{14}$, $Y^{11}$ and $Y^{12}$ has preferably from 1 to 7, more preferably from 1 to 4, carbon atoms. Such a perfluoroalkyl group is preferably linear or branched, more preferably linear. Specifically, it may, for example, be a trifluoromethyl group, a pentafluoroethyl group or a heptafluoropropyl group, and particularly preferred is a trifluoromethyl group.

The perfluoroalkoxy group for $X^{11}$, $X^{12}$, $X^{13}$, $X^{14}$, $Y^{11}$ and $Y^{12}$ may, for example, be one having an oxygen atom (—O—) bonded to the above perfluoroalkyl group.

$X^{11}$ is preferably a fluorine atom.

$X^{12}$ is preferably a fluorine atom, a trifluoromethyl group or a $C_{1-4}$ perfluoroalkoxy group, more preferably a fluorine atom or a trifluoromethoxy group.

Each of $X^{13}$ and $X^{14}$ which are independent of each other, is preferably a fluorine atom or a $C_{1-4}$ perfluoroalkyl group, more preferably a fluorine atom or a trifluoromethyl group.

Each of $Y^{11}$ and $Y^{12}$ which are independent of each other, is preferably a fluorine atom, a $C_{1-4}$ perfluoroalkyl group or a $C_{1-4}$ perfluoroalkoxy group, more preferably a fluorine atom or a trifluoromethyl group.

In the compound (1), $X^{13}$ and $X^{14}$ may be bonded to each other to form a fluorinated alicyclic ring together with the carbon atoms to which $X^{13}$ and $X^{14}$ are bonded.

Such a fluorinated alicyclic ring is preferably a 4- to 6-membered ring.

Such a fluorinated alicyclic ring is preferably a saturated alicyclic ring.

Such a fluorinated alicyclic ring may have an etheric oxygen atom (—O—) in the cyclic skeleton. In such a case, the number of etheric oxygen atoms in the fluorinated alicyclic ring is preferably 1 or 2.

In the compound (2), $Y^{11}$ and $Y^{12}$ may be bonded to each other to form a fluorinated alicyclic ring together with the carbon atoms to which $Y^{11}$ and $Y^{12}$ are bonded.

Such a fluorinated alicyclic ring is preferably a 4- to 6-membered ring.

Such a fluorinated alicyclic ring is preferably a saturated alicyclic ring.

Such a fluorinated alicyclic ring may have an etheric oxygen atom (—O—) in the cyclic skeleton. In such a case, the number of etheric oxygen atoms in the fluorinated alicyclic ring is preferably 1 or 2.

Preferred specific examples of the compound (1) include compounds (1-1) to (1-5).

Specific examples of the compound (2) include compounds (2-1) and (2-2).

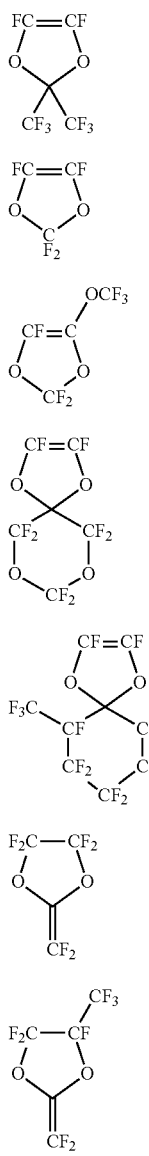

The fluorinated cyclic polymer (I') may be a homopolymer of the above cyclic fluorinated monomer, or may be a copolymer of such a cyclic fluorinated monomer with another monomer.

However, in such a fluorinated cyclic polymer (I'), the proportion of the unit based on the cyclic fluorinated monomer is preferably at least 20 mol %, more preferably at least 40 mol %, or may be 100 mol %, based on the total of all repeating units constituting the fluorinated cyclic polymer (I').

Said another monomer may be one copolymerizable with the above cyclic fluorinated monomer and is not particularly limited. Specifically, the after-mentioned diene-type fluorinated monomer, tetrafluoroethylene, chlorotrifluoroethylene or perfluoro(methyl vinyl ether) may, for example, be mentioned.

The "diene-type fluorinated monomer" is a monomer having two polymerizable double bonds and fluorine atoms. Such polymerizable double bonds are not particularly limited, but preferably vinyl groups, allyl groups, acryloyl groups or methacryloyl groups.

The diene-type fluorinated monomer is preferably a compound (3).

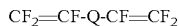 (3)

In the formula, Q is a $C_{1-3}$ perfluoroalkylene group which may have an etheric oxygen atom and wherein some of fluorine atoms may be substituted by halogen atoms other than fluorine atoms. Such halogen atoms other than fluorine atoms may, for example, be chlorine atoms or bromine atoms.

In a case where Q is a perfluoroalkylene group having an etheric oxygen atom, the etheric oxygen atom in the perfluoroalkylene group may be present at one terminal of the group or may be present at both terminals of the group, or may be present between carbon atoms of the group. From the viewpoint of the cyclopolymerizability, it is preferably present at one terminal of the group.

As the unit to be formed by cyclopolymerization of the compound (3), repeating units of the following formulae (3-1) to (3-4) may be mentioned.

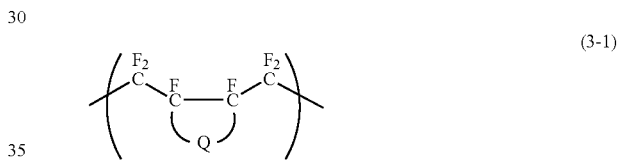 (3-1)

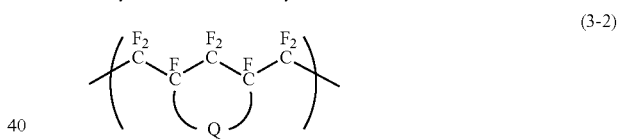 (3-2)

 (3-3)

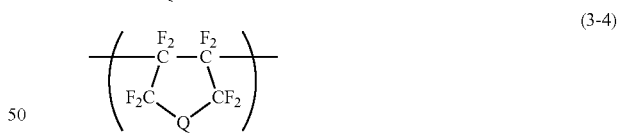 (3-4)

The following compounds may be mentioned as specific examples of the compound (3).

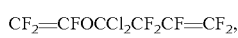

$CF_2=CFOCF_2OCF=CF_2$, $CF_2=CFOC(CF_3)_2OCF=CF_2$, $CF_2=CFOCF_2CF(OCF_3)CF=CF_2$, $CF_2=CFCF_2CF=CF_2$, $CF_2=CFCF_2CF_2CF=CF_2$, $CF_2=CFCF_2OCF_2CF=CF_2$, etc.

The fluorinated cyclic polymer (II') may be constituted solely by a unit formed by cyclopolymerization of the above diene-type fluoromonomer, or may be a copolymer of such a unit with another unit.

However, in such a fluorinated cyclic polymer (II'), the proportion of the unit formed by cyclopolymerization of the diene-type fluorinated monomer is preferably at least 50 mol %, more preferably at least 80 mol %, most preferably 100 mol %, based on the total of all repeating units constituting the fluorinated cyclic polymer (II').

Said another monomer may be one copolymerizable with the above diene-type fluorinated monomer and is not particularly limited. Specifically, a cyclic fluorinated monomer such as the above-mentioned compound (1) or (2), tetrafluoroethylene, chlorotrifluoroethylene, or perfluoro(methyl vinyl ether) may, for example, be mentioned.

The fluororesin (a1)) may suitably be selected from commercial products, or may be synthesized by a usual method.

For example, a fluorinated cyclic polymer may be produced by carrying out e.g. cyclopolymerization, homopolymerization or copolymerization of monomers for the respective units by applying a conventional method disclosed in e.g. JP-A-4-189880.

Further, as commercial products of the fluorinated cyclic polymer, CYTOP (registered trademark) (manufactured by Asahi Glass Company, Limited), Teflon (registered trademark) AF (manufactured by Du Pont) and HYFLON (registered trademark) AD (manufactured by Solvey Solexis) may, for example, be mentioned.

In the present invention, the resin (a2) having such an alicyclic structure and containing no fluorine atom, may, for example, be a cycloolefin polymer.

The "cycloolefin polymer" is a polymer having an aliphatic hydrocarbon cyclic structure in the main chain of the polymer and is meant for one wherein at least two among carbon atoms constituting such an aliphatic hydrocarbon cyclic structure are incorporated in the main chain of the polymer.

The cycloolefin polymer has a unit having an aliphatic hydrocarbon cyclic structure (hereinafter sometimes referred to as a unit (z1)), and in such a unit (z1), at least two among carbon atoms constituting such an aliphatic hydrocarbon cyclic structure are incorporated in the main chain of the polymer.

As the cycloolefin polymer, preferred may be one containing the following unit (z1-1):

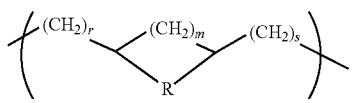
(z1-1)

wherein R is a bivalent hydrocarbon group which may have a substituent, m is an integer of from 0 to 10, r is an integer of 0 or 1, and s is an integer of 0 or 1.

In the formula (z1-1), the hydrocarbon group for R "may have a substituent", which means that some or all of hydrogen atoms in the hydrocarbon group may be substituted by substituents.

Such a substituent may, for example, be an alkyl group, a cycloalkyl group, an alkoxy group, an aryl group such as a phenyl group, or a polycyclic aliphatic hydrocarbon group such as an adamantyl group.

The alkyl group as such a substituent may be linear or branched and has preferably from 1 to 10, more preferably from 1 to 3, carbon atoms. Such an alkyl group is preferably a methyl group, an ethyl group, a propyl group or an isopropyl group, particularly preferably a methyl group or an ethyl group.

The cycloalkyl group as such a substituent has preferably from 3 to 10, more preferably from 5 to 8, carbon atoms. Such a cycloalkyl group is particularly preferably a cyclopentyl group or a cyclohexyl group.

The alkoxy group as such a substituent may, for example, be one having an oxygen atom (—O—) bonded to the above alkyl group.

The hydrocarbon group for R may be in a chain form or cyclic. Further, such a hydrocarbon group may be saturated or unsaturated, preferably saturated.

The chain form hydrocarbon group is preferably a linear alkylene group which may have a substituent, and it has preferably from 1 to 4, more preferably from 2 to 3, most preferably 2, carbon atoms. Specifically, a dimethylene group may be mentioned.

The cyclic hydrocarbon group is preferably a group having two hydrogen atoms removed from a monocyclic or polycyclic cycloalkane which may have a substituent. The monocyclic cycloalkane may, for example, be cyclopentane or cyclohexane. The polycyclic cycloalkane may, for example, be norbornane or adamantane. Among them, cyclopentane or norbornane is preferred.

In the formula (z1-1), m is an integer of from 0 to 10.

In a case where m is an integer of at least 1, as in the after-mentioned unit (z1-11), the polymer main chain is bonded not at the o-position but with a space or at least one methylene chain, of the aliphatic hydrocarbon cyclic structure, so that the aliphatic hydrocarbon cyclic structure is incorporated in the polymer main chain. In such a case, m is preferably an integer of from 1 to 3, most preferably 1.

When m is 0, as shown in the after-mentioned unit (z1-21), the polymer main chain is bonded at the o-position of the aliphatic hydrocarbon cyclic structure, so that the aliphatic hydrocarbon cyclic structure is incorporated in the polymer main chain.

Each of r and s may be 0 or 1.

Particularly when m is 0, r and s are preferably 0. Further, when m is 1, r and s are preferably 1.

As the unit (z1-1), preferred may, for example, be the following unit (z1-11) or unit (z1-21).

(z1-11)

wherein each of $R^1$ and $R^2$ which are independent of each other, is a hydrogen atom, an alkyl group or a cycloalkyl group, and $R^1$ and $R^2$ may be bonded to each other to form a ring.

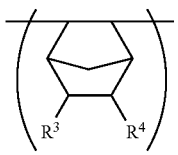
(z1-21)

wherein each of $R^3$ and $R^4$ which are independent of each other, is a hydrogen atom, an alkyl group or a cycloalkyl group, or $R^3$ and $R^4$ may be bonded to each other to form a ring.

In the formula (z1-11), the alkyl group or the cycloalkyl group for $R^1$ or $R^2$ may, respectively, be the same one as the alkyl group or the cycloalkyl group mentioned as the above substituent.

$R^1$ and $R^2$ may be bonded to each other to form a ring together with the carbon atoms to which $R^1$ and $R^2$ are respectively bonded. In such a case, the ring to be formed is preferably a monocyclic or polycyclic cycloalkane. The monocyclic cycloalkane may, for example, be cyclopentane or cyclohexane. The polycyclic cycloalkane may, for example, be norbornane or adamantane. Among them, cyclopentane or norbornane is preferred.

Such a ring may have a substituent. The substituent may, for example, be the same one as the substituent which the above-mentioned hydrocarbon group for R may have.

Specific examples of the unit (z1-11) in a case where $R^1$ and $R^2$ form a ring, include the following units (z1-11-1) and (z1-12-1).

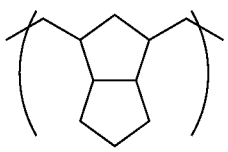
(z1-11-1)

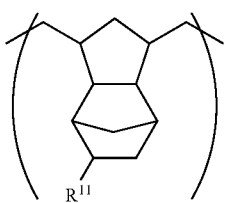
(z1-12-1)

wherein $R^{11}$ is a hydrogen atom or an alkyl group.

The alkyl group for $R^{11}$ may, for example, be the same one as the alkyl group mentioned as the substituent which the above-mentioned hydrocarbon group for R may have, and particularly preferred is a methyl group.

In the present invention, the unit (z1-11) is preferably one wherein $R^1$ and $R^2$ form a ring, or one wherein at least one of $R^1$ and $R^2$ is a cycloalkyl group.

In the formula (z1-21), $R^3$ and $R^4$ are, respectively, the same as the above $R^1$ and $R^2$.

Specific examples of the unit (z1-21) in a case where $R^3$ and $R^4$ form a ring, include the following units (z1-21-1) and (z1-21-2).

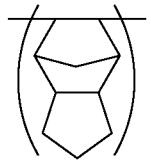
(z1-21-1)

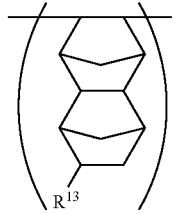
(z1-21-2)

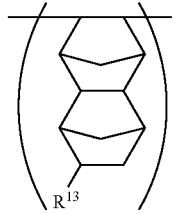

wherein $R^{13}$ is a hydrogen atom or an alkyl group.

The alkyl group for $R^{13}$ may, for example, be the same one as the alkyl group mentioned as the substituent which the above-mentioned hydrocarbon group for R may have, and particularly preferred is a methyl group.

The cycloolefin polymer may contain one or more types among the above-described units, as the unit (z1).

The proportion of the unit (z1) in the cycloolefin polymer is preferably at least 30 mol %, more preferably at least 40 mol %, or may be 100 mol %, based on the total of all repeating units constituting the cycloolefin polymer.

The cycloolefin polymer may contain a unit other than the unit (z1) (hereinafter sometimes referred to as a unit (z2)).

As the unit (z2), an optional unit which has been used for a cycloolefin polymer, may be used without any particular limitation.

As such a unit (z2), a unit based on an olefin which may have a substituent, is preferred, and as such a unit, the following unit (z2-1) may, for example, be mentioned.

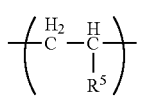
(z2-1)

wherein $R^5$ is a hydrogen atom or an alkyl group.

In the formula, the alkyl group for $R^5$ may be the same one as the alkyl group mentioned as the substituent which the above-mentioned hydrocarbon group for R may have.

The cycloolefin polymer to be used in the present invention is particularly preferably the following cycloolefin polymer (I) or cycloolefin polymer (II).

Cycloolefin polymer (I): a cycloolefin polymer containing the above unit (z1-11).

Cycloolefin polymer (II): a cycloolefin polymer containing the above unit (z1-21) and the unit (z2).

The cycloolefin polymer (I) may contain one or more types as the unit (z1-11).

Further, the cycloolefin polymer (I) may contain a unit other than the unit (z1-11) within a range not to impair the effects of the present invention. In the cycloolefin polymer (I), the proportion of the unit (z1-11) is preferably at least 80 mol %, more preferably at least 90 mol %, particularly preferably 100 mol %, based on the total of all repeating units constituting the cycloolefin polymer (I). That is, as the cycloolefin polymer (I), a polymer composed solely of the unit (z1-11) is particularly preferred.

The cycloolefin polymer (II) may contain one or more types as each of the unit (z1-21) and the unit (z2).

Further, the cycloolefin polymer (II) may contain a unit other than the unit (z1-21) and the unit (z2) within a range not to impair the effects of the present invention.

In the cycloolefin polymer (II), the proportion of the unit (z1-21) is preferably from 20 to 70 mol %, more preferably from 30 to 50 mol %, based on the total of all repeating units constituting the cycloolefin polymer (II). Further, the proportion of the unit (z2) is preferably from 30 to 80 mol %, more preferably from 50 to 70 mol %, based on the total of all repeating units constituting the cycloolefin polymer (II).

Further, the content ratio (molar ratio) of the unit (z1-21) to the unit (z2) in the cycloolefin polymer (II) is preferably within a range of the unit (z1-21):the unit (z2)=20:80 to 70:30, more preferably within a range of 30:70 to 50:50.

Preferred specific examples of the cycloolefin polymer (II) include copolymers containing two types of the respective units as shown by the following formulae (II-1) and (II-2):

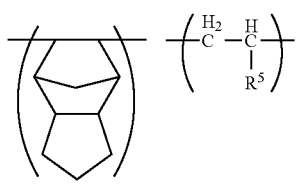
(II-1)

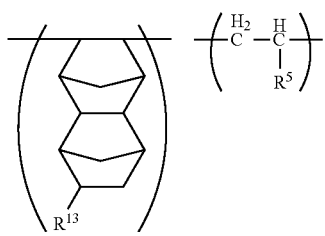
(II-2)

wherein $R^{13}$ and $R^5$ are, respectively, as defined above.

The cycloolefin polymer may have functional groups as terminal groups at the main chain terminals and/or side chain portions.

Such a functional group may, for example, be an alkoxy carbonyl group (which may be referred to also as an ester group), a carboxy group, a carboxylic acid halide group, an amide group, a hydroxy group, an amino group, a sulfonic acid group, a sulfonate group, a sulfonamide group, a thiol group or a cyano group. Among them, an alkoxy carbonyl group or a carboxy group is preferred.

In a case where a carboxy group is contained as a terminal group, a silane compound may be bonded to such a carboxy group.

The silane compound may be bonded to such a carboxy group, for example, by reacting a cycloolefin polymer having a carboxy group at a terminal group, with a silane coupling agent which will be described hereinafter.

A cycloolefin polymer having functional groups such as alkoxy carbonyl groups or carboxy groups as terminal groups, may, for example, be a modified resin obtained by graft-copolymerizing a modified monomer composed of an unsaturated carboxylic acid and its derivative, to a cycloolefin polymer.

Such an unsaturated carboxylic acid may, for example, be acrylic acid, methacrylic acid, α-ethylacrylic acid, maleic acid, fumaric acid, itaconic acid, citraconic acid, nadic acid or methylnadic acid. The derivative of such an unsaturated carboxylic acid may, for example, be an acid halide, amide, imide, acid anhydride or ester, of the above unsaturated carboxylic acid. Specifically, malenyl chloride, maleic anhydride, citraconic anhydride, methyl maleate or dimethyl maleate may, for example, be mentioned.

The cycloolefin polymer is not particularly limited so long as it is one which satisfies the desired characteristics such as the relative dielectric constant. A commercially available one may be employed, or it may the synthesized.

As methods for the synthesis of the cycloolefin polymer, the following (1) to (7) are, for example, known.

Here, the represented unit in the final product in each reaction formula shows a unit contained in the obtained cycloolefin polymer.

(1) A method wherein a norbornene and an olefin are subjected to addition copolymerization (e.g. a method shown by the following reaction formula (1')).

(2) A method wherein a ring opened metathesis polymer of a norbornene is subjected to hydrogenation (e.g. a method shown by the following reaction formula (2'))

(3) A method wherein an alkylidene norbornene is subjected to transannular polymerization (e.g. a method shown by the following reaction formula (3')).

(4) A method wherein a norbornene is subjected to addition polymerization (e.g. a method shown by the following reaction formula (4')).

(5) A method wherein 1,2- and 1,4-addition polymers of cyclopentadiene are subjected to hydrogenation (e.g. a method shown by the following reaction formula (5')).

(6) A method wherein 1,2- and 1,4-addition polymers of cyclohexadiene are subjected to hydrogenation (e.g. a method shown by the following reaction formula (6')).

(7) A method wherein a conjugated diene is subjected to cyclopolymerization (e.g. a method shown by the following reaction formula (7')).

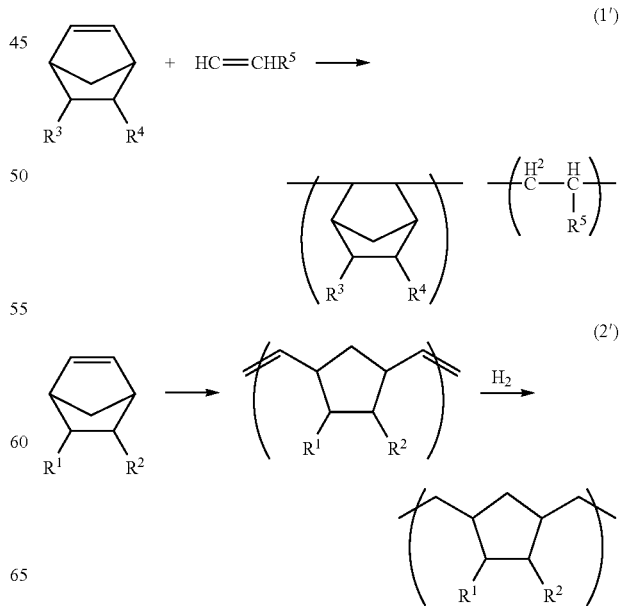

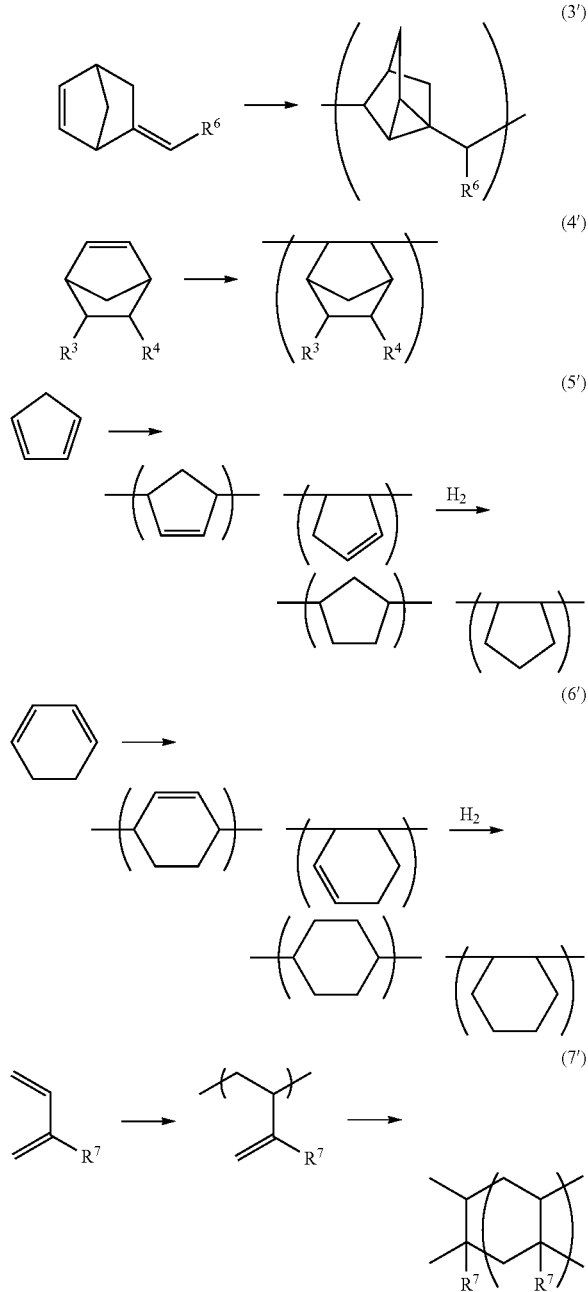

In each reaction formula, $R^1$ to $R^5$ are as defined above.

Each of $R^6$ and $R^7$ which are independent of each other, is an alkyl group, and such an alkyl group may be the same one as the alkyl group mentioned as a substituent which the above-mentioned hydrocarbon group for R may have.

Among them, preferred are a cycloolefin polymer obtainable by the method (1) (an addition copolymer of a norbornene and an olefin) and a cycloolefin polymer obtainable by the method (2) (a hydrogenated polymer of a ring opened metathesis polymer of a norbornene) in view of the excellent film-forming property and efficiency in their syntheses.

The addition copolymer of a norbornene may, for example, be one commercially available under a tradename of APEL (registered trademark) (manufactured by Mitsui Chemicals Inc.) or TOPAS (registered trademark) (manufactured by Ticona).

As the hydrogenated polymer of a ring-opened metathesis polymer of a norbornene, various ones are available, but polymers commercially available under tradenames of ZEONEX (registered trademark) (manufactured by ZEON CORPORATION), ZEONOR (registered trademark) (manufactured by ZEON CORPORATION) and ARTON (registered trademark) (manufactured by JSR Corporation) are preferred since they have transparency, low moisture absorption and heat resistance.

The weight average molecular weight of the resin (a) is preferably from 3,000 to 1,000,000, more preferably from 10,000 to 300,000.

Further, the resin (a) preferably has a glass transition temperature or melting point of at least 80° C., more preferably at least 100° C. When the glass transition temperature or melting point is at least 80° C., particularly at least 100° C., the electret will be excellent in heat resistance, stability of maintained charge, etc. Further, such a glass transition temperature or melting point is preferably at most 350° C., more preferably at most 250° C., most preferably at most 200° C., in consideration of e.g. the film-forming property at the time of forming the resin (a) into a film or the solubility of the resin (a) in a solvent.

The glass transition temperature or melting point of the resin (a) can be adjusted by adjusting the types or proportions of the repeating units constituting the resin (a). For example, in the case of an amorphous resin such as the above fluorinated cyclic polymer or cycloolefin polymer, the repeating units based on the above compound (1) or (2) contribute to an improvement of the glass transition temperature of the polymer, and the larger the proportion of such units, the higher the glass transition temperature. Here, the melting point of the resin (a) is observed in a crystalline resin e.g. a resin such as PTFE, FEP, ETFE, or PFA, among the above fluororesins, and it can be adjusted by copolymerizing a highly crystalline unit such as tetrafluoroethylene or ethylene with a unit which disturbs crystallinity (e.g. a perfluoro(alkyl vinyl ether) or the like.

A method for forming the layer (A) is not particularly limited. However, as a preferred method, a method may, for example, be mentioned wherein the resin (a) is dissolved in a solvent to prepare a coating composition, and by using such a coating composition, a coating film is formed.

Such forming of a coating film may be carried out, for example, by coating a substrate or the surface of the layer (B) with the coating composition, followed by drying by e.g. baking. As the coating method, a conventional method for forming a film from a solution may be used without any particular limitation. Specific examples of such a method include, for example, a roll coater method, a casting method, a dipping method, a spin coating method, a casting-on-water method, a Lanmuir.Blodgett method, a die coating method, an inkjet method and a spray coating method. Otherwise, it is possible to employ a printing technique such as a relief printing method, a gravure printing method, a lithography method, a screen printing method or a flexo printing method.

A solvent for the coating composition is not particularly limited so long as it is one capable of dissolving the resin (a) and forming a coating film having a desired thickness and uniformity by a desired coating method, and it may, for example, be a protic solvent or an aprotic solvent.

The protic solvent may, for example, be methanol, ethanol, 1-propanol, isopropyl alcohol, 1-butanol, 2-butanol, t-butanol, pentanol, hexanol, 1-octanol, 2-octanol, ethylene glycol, ethylene glycol monomethyl ether, propylene glycol monomethyl ether, propylene glycol monobutyl ether, propylene glycol, methyl lactate or the after-mentioned protic fluorinated solvent.

The aprotic solvent may, for example, be hexane, cyclohexane, heptane, octane, decane, dodecane, decalin, acetone, cyclohexanone, 2-butanone, dimethoxyethane, monomethyl ether, ethyl acetate, butyl acetate, diglyme, triglyme, propylene glycol monomethyl ether monoacetate (PGMEA), N,N-dimethylformamide (DMF), N,N-dimethylacetamide (DMA), N-methylpyrrolidone, tetrahydrofuran, anisole, dichloromethane, dichloroethane, chloroform, carbon tetrachloride, chlorobenzene, dichlorobenzene, benzene, toluene, xylene, ethylbenzene, mesitylene, tetralin, methylnaphthalene, or the after-mentioned aprotic fluorinated solvent.

These solvents may be used alone or in combination as a mixture of two or more of them. Further, a wide range of compounds other than these solvents may also be used.

Among them, in a case where a fluororesin (a1)) is used as the resin (a), as the solvent, an aprotic solvent is preferred, and an aprotic fluorinated solvent is more preferred.

Further, in a case where a resin (a2) such as a cycloolefin polymer is used as the resin (a), as the solvent, an aprotic solvent is preferred, a hydrocarbon is more preferred, an aromatic hydrocarbon such as benzene, toluene, xylene, ethylbenzene, mesitylene, tetralin or methylnaphthalene is further preferred, and toluene or xylene is particularly preferred.

As the aprotic fluorinated solvent, preferred may, for example, be the following fluorinated compounds.

A fluorinated aromatic compound such as hexafluoromethaxylylene, fluorobenzene, difluorobenzene, perfluorobenzene, pentafluorobenzene, 1,3-bis(trifluoromethyl)benzene or 1,4-bis(trifluoromethyl)benzene; a perfluorotrialkylamine compound such as perfluorotributylamine or perfluorotripropylamine; a perfluorocycloalkane compound such as perfluorodecalin, perfluorocyclohexane or perfluoro(1,3,5-trimethylcyclohexane); a perfluorocyclic ether compound such as perfluoro(2-butyltetrahydrofuran); a low molecular weight perfluoropolyether; a perfluoroalkane such as perfluorohexane, perfluorooctane, perfluorodecane, perfluorododecane, perfluoro(2,7-dimethyloctane), perfluoro(1,2-dimethylhexane) or perfluoro(1,3-dimethylhexane); a chlorofluorocarbon such as 1,1,2-trichloro-1,2,2,-trifluoroethane, 1,1,1-trichloro-2,2,2-trifluoroethane, 1,3-dichloro-1,1,2,2,3-pentafluoropropane, 1,1,1,3-tetrachloro-2,2,3,3-tetrafluoropropane or 1,1,3,4-tetrachloro-1,2,2,3,4,4-hexafluorobutane, a hydrofluorocarbon such as 1,1,1,2,2,3,3,5,5,5-decafluoropentane, 1,1,1,2,2,3,3,4,4,5,5,6,6-tridecafluorohexane, 1,1,1,2,2,3,3,4,4,5,5,6,6,7,7,8,8-heptadecafluorooctane, 1,1,1,2,2,3,3,4,4,5,5,6,6,7,7,8,8,9,9,10,10-henicosafluorodecane, 1,1,1,2,2,3,3,4,4-nonafluorohexane, 1,1,1,2,2,3,3,4,4,5,5,6,6-tridecafluorooctane, 1,1,1,2,2,3,3,4,4,5,5,6,6,7,7,8,8-heptadecafluorodecane, 1,1,1,2,3,4,5,5,5-nonafluoro-4-(trifluoromethyl)pentane or 1,1,1,2,2,3,5,5,5-nonafluoro-4-(trifluoromethyl)pentane; and a hydrochlorofluorocarbon such as 3,3-dichloro-1,1,1,2,2-pentafluoropropane or 1,3-dichloro-1,1,2,2,3-pentafluoropropane.

These fluorinated compounds may be used alone or in combination as a mixture of two or more of them.

Further, a wide range of aprotic fluorinated solvents other than the above may, also be used.

For example, a fluorinated solvent such as hydrofluoroether (HFE) is preferred. Such a fluorinated solvent is a fluorinated solvent (hereinafter sometimes referred to as a fluorinated solvent (2)) represented by the general formula $R^{31}$—O—$R^{32}$ (wherein $R^{31}$ is a $C_{5-12}$ linear or branched polyfluoroalkyl group which may have an etheric oxygen atom, and $R^{32}$ is a $C_{1-5}$ linear or branched alkyl group or a polyfluoroalkyl group).

The polyfluoroalkyl group for $R^{31}$ is a group wherein at least two hydrogen atoms in an alkyl group are substituted by fluorine atoms and includes a perfluoroalkyl group wherein all hydrogen atoms in an alkyl group are substituted by fluorine atoms and a group wherein at least two hydrogen atoms in an alkyl group are substituted by fluorine atoms and at least one hydrogen atom in the alkyl group is substituted by a halogen atom other than a fluorine atom. The halogen atom other than a fluorine atom is preferably a chlorine atom.

The polyfluoroalkyl group is preferably a group wherein at least 60%, more preferably at least 80%, by number of hydrogen atoms in the corresponding alkyl group are substituted by fluorine atoms. A more preferred polyfluoroalkyl group is a perfluoroalkyl group.

In a case where $R^{31}$ has an etheric oxygen atom, if the number of etheric oxygen atoms is too large, the solubility will be impaired, and therefore, the number of etheric oxygen atoms in $R^{31}$ is preferably from 1 to 3, more preferably from 1 to 2.

When the number of carbon atoms in $R^{31}$ is at least 5, the solubility of the fluororesin (a1)) will be good, and when the number of carbon atoms in $R^{31}$ is at most 12, such a solvent is readily industrially available. Accordingly, the number of carbon atoms in $R^{31}$ is selected within a range of from 5 to 12. The number of carbon atoms in $R^{31}$ is preferably from 6 to 10, more preferably from 6 to 7 and from 9 to 10.

The number of carbon atoms in $R^{32}$ is from 1 to 5, and when the number of carbon atoms is at most 5, the solubility of the fluororesin (a1)) will be good. A preferred example of $R^{32}$ is a methyl group or an ethyl group.

The molecular weight of the fluorinated solvent (2) is preferably at most 1,000, since if it is too large, not only the viscosity of the coating composition is likely to increase but also the solubility of the fluororesin (a1)) decreases.

Further, the fluorine content of the fluorinated solvent (2) is preferably from 60 to 80 mass %, whereby the solubility of the fluororesin (a1)) will be excellent.

As preferred fluorinated solvents (2), the following may be exemplified.

$F(CF_2)_4OCH_3$, $CF_3CH_2OCF_2CF_2H$, $F(CF_2)_5OCH_3$, $F(CF_2)_6OCH_3$, $F(CF_2)_7OCH_3$, $F(CF_2)_8OCH_3$, $F(CF_2)_9OCH_3$, $F(CF_2)_{10}OCH_3$, $H(CF_2)_6OCH_3$, $(CF_3)_2CFCF(OCH_3)CF_2CF_3$, $F(CF_2)_3OCF(CF_3)CF_2OCH_3$, $F(CF_2)_3OCF(CF_3)CF_2OCF(CF_3)CF_2OCH_3$, $F(CF_2)_8OCH_2CH_2CH_3$, $(CF_3)_2CFCF_2CF_2OCH_3$, $F(CF_2)_2O(CF_2)_4OCH_2CH_3$.

Among such fluorinated solvents, particularly preferred is $(CF_3)_2CFCF(OCH_3)CF_2CF_3$.

To the above coating composition, a silane coupling agent may be incorporated, whereby a coating film formed by using such a coating composition is excellent in the adhesion to the substrate.

The silane coupling agent is not particularly limited, and a wide range of silane coupling agents including known agents may be used. The following ones may specifically be exemplified.

A monoalkoxysilane such as trimethylmethoxysilane, trimethylethoxysilane, dimethylvinylmethoxysilane or dimethylvinylethoxysilane.

A dialkoxysilane such as γ-chloropropylmethyldimethoxysilane, γ-chloropropylmethyldimethoxysilane, γ-aminopropylmethyldiethoxysilane, γ-aminopropylmethyldimethoxysilane, N-(β-aminoethyl)-γ-aminopropylmethyldimethoxysilane, N-(β-aminoethyl)-γ-aminopropylmethyldiethoxysilane, γ-glycidyloxypropylmethyldimethoxysilane, γ-glycidyloxypropylmethyldiethoxysilane, γ-methacryloyloxypropylmethyldimethoxysilane, methyldimethoxysilane, methyldiethoxysilane, dimethyldimethoxysilane, dimethyldiethoxysilane, methylvinyldimethoxysilane, methylvinyldiethoxysilane, diphenyldimethoxysilane, diphenyldiethoxysilane, 3,3,3-trifluoropropylmethyldimethoxysilane, 3,3,4,4,5,5,6,6,7,7,8,8,8-tridecafluorooctylmethyldimethoxysilane or 3,3,4,4,5,5,6,6,7,7,8,8,9,9,10,10,10-heptadecafluorodecylmethyldimethoxysilane.

A tri- or tetra-alkoxysilane such as γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane, γ-mercaptopropyltrimethoxysilane, γ-glycidyloxypropyltrimethoxysilane, γ-glycidyloxypropyltriethoxysilane, γ-methacryloyloxypropyltrimethoxysilane, γ-chloropropyltrimethoxysilane, methyltriethoxysilane, phenyltrimethoxysilane, phenyltriethoxysilane, 3,3,3-trifluoropropyltrimethoxysilane, 3,3,4,4,5,5,6,6,7,7,8,8,8-tridecafluorooctyltrimethoxysilane, 3,3,4,4,5,5,6,6,7,7,8,8,9,9,10,10,10-heptadecafluorodecyltrimethoxysilane, tetramethoxysilane or tetraethoxysilane.

Further, as a preferred silane coupling agent, an aromatic amine type silane coupling agent being a silane coupling agent having an aromatic amine structure may be mentioned. Compounds represented by the following formulae (s1) to (s3) may be mentioned as such aromatic amine type silane coupling agents.

ArSi(OR$^{21}$)(OR$^{22}$)(OR23)  (s1)

ArSiR$^{24}$(OR$^{21}$)(OR$^{22}$)  (s2)

ArSiR$^{24}$R$^{25}$(OR$^{21}$)  (s3)

wherein each of R$^{21}$ to R$^{25}$ which are independent of one another, is a hydrogen atom, a C$_{1-20}$ alkyl group or an aryl group, and Ar is a p-, m- or o-aminophenyl group.

As specific examples of the compounds represented by the formulae (s1) to (s3), the following ones may be mentioned.

Aminophenyltrimethoxysilane, aminophenyltriethoxysilane, aminophenyltripropoxysilane, aminophenyltriisopropoxysilane, aminophenylmethyldimethoxysilane, aminophenylmethyldiethoxysilane, aminophenylmethyldipropoxysilane, aminophenylmethyldiisopropoxysilane, aminophenylphenyldimethoxysilane, aminophenylphenyldiethoxysilane, aminophenylphenyldipropoxysilane, aminophenyldiisopropoxysilane, etc.

A hydrogen atom of an amino group in these compounds may be substituted by an alkyl group or an aryl group. For example, N,N-dimethylaminophenyltrialkoxysilane or N,N-dimethylaminophenylmethyldialkoxysilane may, for example, be mentioned. In addition, for example, aromatic amine type silane coupling agents disclosed in U.S. Pat. No. 3,481,815 may be used.

The above silane coupling agents may be used alone, or two or more of them may be used in combination.

Further, a partially hydrolyzed condensate of the above silane coupling agent may preferably be used.

Further, a co-partially hydrolyzed condensate of the above silane coupling agent with a tetraalkoxysilane such as tetramethoxysilane, tetraethoxysilane or tetrapropoxysilane, may also preferably be used. Among them, as one to improve the adhesion of the resin (a) without impairing the electrical insulation properties of the resin (a), a silane coupling agent having an amino group (such as γ-aminopropyltriethoxysilane, γ-aminoproplymethyldiethoxysilane, γ-aminopropyltrimethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, aminophenyltrimethoxysilane, aminophenyltriethoxysilane, aminophenylmethyldimethoxysilane or aminophenylmethyldiethoxysilane) or a silane coupling agent having an epoxy group (such as γ-glycidyloxypropyltrimethoxysilane, γ-glycidyloxypropylmethyldimethoxysilane, γ-glycidyloxypropyltriethoxysilane or γ-glycidyloxypropylmethyldiethoxysilane) may be exemplified as a particularly preferred one.

In a case where as the resin (a), one having a carboxy group preliminarily introduced to a side chain or at a terminal of the main chain, is used, an alkoxysilane having an amino group or an epoxy group is particularly effective as the silane coupling agent.

In a case where as the resin (a), one having an alkoxy carbonyl group preliminarily introduced to a side chain or at a terminal of the main chain is used, an alkoxysilane having an amino group or an aminophenyl group is particularly effective as a silane coupling agent.

In a case where as a coating composition, an aprotic fluorinated solvent solution of a fluororesin (a1)) is used, a protic fluorinated solvent may be incorporated to such a coating composition. When a protic fluorinated solvent is incorporated to the coating composition, it is possible to increase the solubility of the silane coupling agent in the coating composition. Further, it is possible to suppress an increase of the viscosity or gelation which is considered to be attributable to a reaction of the silane coupling agent itself.

That is, in an aprotic fluorinated solvent, the above-mentioned trialkoxysilane having an amino group or an epoxy group is likely to undergo gelation or viscosity increase with time, as compared with a dialkoxysilane having a similar group. Further, a trialkoxysilane has a smaller solubility in an aprotic fluorinated solvent solution of the coating composition, than the dialkoxysilane. Accordingly, in a case where as the coating composition, an aprotic fluorinated solvent solution of a fluororesin (a1)) is used, and a trialkoxysilane is incorporated thereto, it is preferred to further add a protic fluorinated solvent, particularly a fluorinated alcohol.

In a case where a dialkoxysilane is incorporated as a coupling agent, although the solubility is not so small as a trialkoxysilane, it is possible to improve the solubility by likewise adding a protic fluorinated solvent, particularly a fluorinated alcohol. In the case of the dialkoxysilane, the viscosity increase with time of the coating composition is not so remarkable as the trialkoxysilane, and accordingly, it is not necessarily required to add a protic fluorinated solvent such as a fluorinated alcohol. However, it is preferred to add such a protic fluorinated solvent, whereby the viscosity increase can certainly be suppressed.

As such a protic fluorinated solvent, the following ones may be exemplified.

A fluorinated alcohol such as trifluoroethanol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-(perfluoro-3-methylbutyl)ethanol, 2,2,3,3-tetrafluoro-1-propanol, 2,2,3,3,4,4,5,5-octafluoro-1-pentanol, 2,2,3,3,4,4,5,5,6,6,-dodecafluoro-1-heptanol, 2,2,3,3,4,4,5,5,6,6,7,7-hexadecafluoro-1-nonanol, 1,1,1,3,3,3-hexafluoro-2-propanol or 2,2,3,3,4,4-hexafluoro-1-butanol.

A fluorinated carboxylic acid such as trifluoroacetic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, 1,1,2,2-tetrafluoropropanoic acid, 1,1,2,2,3,3,4,4-octafluoropentanoic acid, 1,1,2,2,3,3,4,4,5,5-dodecafluoroheptanoic acid or 1,1,2,2,3,3,4,4,5,5,6,6-hexadecafluorononanoic acid, amides of these fluorinated carboxylic acids, or a fluorinated sulfonic acid such as trifluoromethanesulfonic acid or heptadecafluorooctanesulfonic acid.

These protic fluorinated solvents may be used alone, or in combination as a mixture of two or more of them.

In a case where an aprotic fluorinated solvent and a protic fluorinated solvent are used in combination, the proportion of the protic fluorinated solvent based on the sum of the aprotic fluorinated solvent and the protic fluorinated solvent is preferably from 0.01 to 50 mass %, more preferably from 0.1 to 30 mass %.

The concentration of the resin (a) in the coating composition may suitably be set depending upon the thickness of the layer (A) to be formed. It is usually from 0.1 to 30 mass %, preferably from 0.5 to 20 mass %.

Further, in a case where a silane coupling agent is incorporated to the coating composition, the amount is preferably from 0.01 to 50 parts by mass, more preferably from 0.1 to 30 parts by mass, per 100 parts by mass of the resin (a).

<Layer (B)>

The layer (B) is a layer constituted by a resin (b) other than the resin (a) or an inorganic substance (c), and the material constituting the layer (B) (the resin (b) or the inorganic substance (c)) is different from the material constituting the layer (A) (the resin (a)).

The resin (b) is not particularly limited so long as it is other than the above resin (a) and may suitably be selected from known resins.

The resin (b) is preferably one which, when formed into an electret, has a charge retention performance lower than the above resin (a).

Here, the "charge retention performance" includes two types i.e. the capacity of charge which can be retained (the charge retention capacity) and how stably the injected electric charge can be maintained (charge stability). The resin (b) may have either one of the charge retention capacity and the charge stability to be low, but it is preferably lower in both performances than the resin (a).

The charge retention performance of each of the resin (b) and the resin (a) can be evaluated by forming a single film of each of the resin (b) and the resin (a) in the same film thickness, injecting electric charge under the same conditions to form an electret, and measuring the surface voltage immediately after the injection of electric charge (the initial surface voltage) and the surface voltage after storage for a certain time under the same conditions from the injection of electric charge (e.g. for about 200 hours) (the surface voltage after storage). That is, the charge retention capacity can be evaluated from the level of the initial surface voltage, and the charge stability can be evaluated from the difference between the initial surface voltage and the surface voltage after storage.

Specifically, the resin (b) is preferably at least one member selected from the group consisting of a polyimide, a polyparaxylylene resin, a polycarbonate, a polyarylene, a polyarylene ether, a polyether, a polyether sulfone, a polyether ketone, a polyether nitrile, a polyether imide, a polyarylenethioether, a polythioether sulfone, a polysulfone, nylon, a polyester, a polystyrene, a polyethylene, a polypropylene, a polyketone, an epoxy resin, an acrylic resin, a polyurethane and an aramid resin.

The resin (b) is more preferably at least one member selected from the group consisting of a polyimide, a polyparaxylylene resin, a polycarbonate, a polyarylene, a polyarylene ether, a polysulfone and a polyether sulfone, from the viewpoint of efficiency of the film-forming process.

As the resin (b), a thermosetting resin and/or an ultraviolet curable resin may be employed from the viewpoint of increasing the glass transition temperature or melting point. As such a thermosetting resin or ultraviolet curable resin, a polyimide, an epoxy resin or an acrylic resin from the above examples, may, for example, be exemplified, and from the viewpoint of the efficiency of the film-forming process, a polyimide is more preferably employed.

In a case where a polyimide is used as the resin (b), a polyimide precursor excellent in solubility in e.g. an organic solvent is coated and thermally treated to convert the polyimide precursor to a polyimide thereby to form the layer (B). As the polyimide precursor, polyamic acid, or its ester may commonly be used. When a polyimide precursor such as polyamic acid is heated to a high temperature of from 200 to 350° C., an imide ring-closing reaction takes place, and it can be converted to a thermally, chemically, electrically stable polyimide. In the present invention, it is possible to employ a commonly commercially available polyimide.

The polyimide precursor to be used in the present invention is preferably a polyamic acid obtained by reacting a tetracarboxylic acid dianhydride with a diamine compound, or its ester.

The tetracarboxylic acid dianhydride is not particularly limited, and an aromatic tetracarboxylic acid dianhydride which is commonly used for a polyimide synthesis may be used. Specifically, 3,3',4,4'-benzophenonetetracarboxylic dianhydride (BTDA), 3,3',4,4'-biphenyltetracarboxylic dianhydride, 2,3,3',4'-biphenyltetracarboxylic dianhydride, pyromellitic dianhydride, 1,3-bis(2,3-dicarboxyphenoxy)benzene dianhydride, 1,4-bis(2,3-dicarboxyphenoxy)benzene dianhydride, 2,3,3',4'-benzophenonetetracarboxylic dianhydride, 2,2',3,3'-benzophenonetetracarboxylic dianhydride, 2,2',3,3'-biphenyltetracarboxylic dianhydride and 2,2',6,6'-biphenyltetracarboxylic dianhydride may, for example, be mentioned.

As the diamine compound, an aromatic diamine compound is preferred. The aromatic diamine compound is not particularly limited, and an aromatic diamine compound commonly used for a polyamide synthesis may be used. Specifically, 4,4'-diaminodiphenylmethane (DDM), 4,4'-diaminodiphenylether (DPE), 4,4'-bis(4-aminophenoxy)biphenyl (BAPB), 1,4'-bis(4-aminophenoxy)benzene (TPE-Q), 1,3'-bis(4-aminophenoxy)benzene (TPE-R), o-phenylenediamine, m-phenylenediamine, p-phenylenediamine, 3,4'-diaminodiphenyl ether, 4,4'-diaminodiphenyl sulfone, 3,4-diaminodiphenyl sulfone, 3,3'-diaminodiphenyl sulfone, 4,4'-methylene-bis(2-chloroanyline), 3,3'-dimethyl-4,4'-diaminobiphenyl, 2,6'-diaminotoluene, 2,4-diaminochlorobenzene, 3,3'-diaminobenzophenone, 3,4-diaminobenzophenone and 4,4'-diaminobenzophenone may, for example, be mentioned.

The polyparaxylylene resin used as the resin (b) is a special polymer which can be polymerized in a gas phase at a normal temperature. For example, the polyparaxylylene resin is prepared by sublimating a dimer shown below, at a temperature of about 160° C., followed by thermal decomposition at 690° C. to obtain a monomer, which is introduced into a vacuum container (absolute pressure of about 4 Pa) at a normal temperature and polymerized on a solid surface.

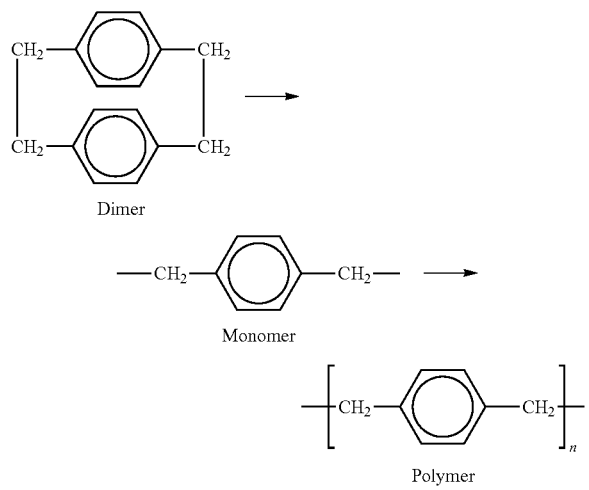

Dimer

Monomer

Polymer

The polyparaxylylene resin includes some types. Among them, one having a molecular structure wherein chlorine is bonded to a benzene ring (tradename: Parylene-C) has a relative dielectric constant of 2.95 at a frequency of 1 MHz and has a characteristic such that the dielectric breakdown strength and chemical resistance are high, and thus it is suitable as the resin (b). Including such Parylene-C, examples of polyparaxylylenes useful as the resin (b) will be shown below. Here, below the respective structural formulae, tradenames are shown.

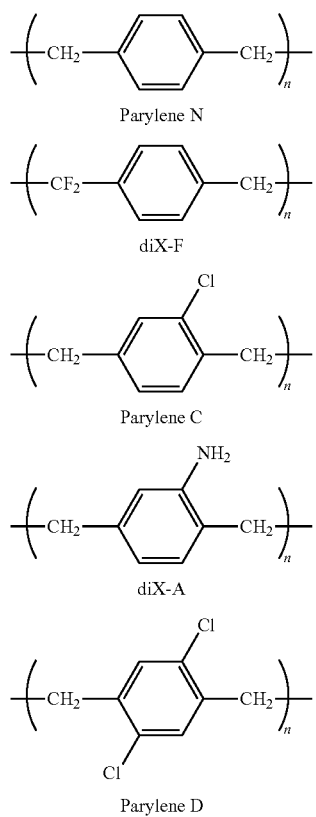

Parylene N diX-F

Parylene C diX-A

Parylene D

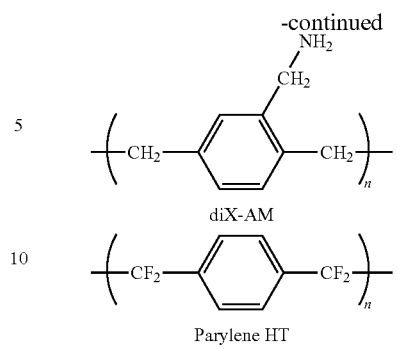

diX-AM

Parylene HT

The resin (b) preferably has a glass transition temperature or melting point of at least 80° C., more preferably at least 110° C. When the glass transition temperature or melting point is at least 80° C., the electret will be excellent in the heat resistance and charge retention stability.

The weight average molecular weight of the resin (b) is preferably from 3,000 to 10,000,000, more preferably from 10,000 to 1,000,000.

The inorganic substance (c) may be suitably selected from known inorganic substances. Specifically, it is preferably at least one member selected from the group consisting of a metal oxide, a metal sulfide or a metal halide, and particularly from the viewpoint of the relative dielectric constant, a metal oxide is suitably employed.

The metal oxide may, for example, be silicon oxide, titanium oxide, zirconium oxide, aluminum oxide, cerium oxide, calcium oxide, magnesium oxide, tin oxide, manganese dioxide, nickel oxide, chromium oxide, cobalt oxide, silver oxide, copper oxide, zinc oxide, iron oxide, molybdenum oxide, barium titanate, strontium titanate, or potassium niobate.

The metal sulfide may, for example, be zinc sulfide, aluminum sulfide, potassium sulfide, silver sulfide, silicon sulfide, tin sulfide, cerium sulfide, magnesium sulfide, copper sulfide, iron sulfide, or molybdenum sulfide.

The metal halide may, for example, be silver fluoride, calcium fluoride, cerium fluoride, copper fluoride, barium fluoride, magnesium fluoride, lithium fluoride, copper chloride, silver chloride, calcium chloride, zirconium chloride, tin chloride, cerium chloride, silver bromide, cobalt bromide, cesium bromide or copper bromide.

Among them, a metal oxide is preferred, and from the viewpoint of electret properties, at least one member selected from the group consisting of silicon oxide, titanium oxide, zirconium oxide, aluminum oxide, cerium oxide, tin oxide, manganese dioxide, nickel oxide, iron oxide and barium titanate is preferred, and particularly preferred is silicon oxide.

The layer (B) may be one containing the resin (b) or one containing the inorganic substance (c).

The method for forming the layer (B) is not particularly limited, and a conventional film-forming method may be used depending upon the material to be used.

In a case where the resin (b) is used as the layer (B), film forming may be carried out by a wet coating method, or film forming may be carried out by press-forming a film. Otherwise, film forming may be carried out by a dry process such as vapor deposition, CVD or sputtering. Particularly from the viewpoint of the film forming process, film forming is preferably carried out by a wet coating method.

In a case where the layer (B) is to be formed by a wet coating method, as the resin (b), one having a solubility such that it is soluble in a solvent, preferably soluble at a concentration of at least 5 mass % in a solvent to be used at 25° C., is used. If such a solubility is less than 5 mass %, it tends to be difficult to obtain a good coating film. Such a solubility is preferably at least 10 mass %, more preferably at least 15 mass %. The upper limit of the solubility is preferably 50 mass %, more preferably 30 mass % in consideration of deterioration of the filtration property or film forming property by an increase of the solution viscosity.

The film forming of the layer (B) by a coating method can be carried out by the same method as the method for film forming the coating film as mentioned as the method for forming the layer (A). That is, it can be carried out by dissolving the resin (b) in a solvent to prepare a coating composition, and coating the surface of a substrate or the layer (A) with the coating composition, followed by drying by e.g. baking.

To such a coating composition, a silane coupling agent may be incorporated. A coating film (layer (B)) formed by using such a coating composition will be excellent in adhesion to the substrate or the layer (A). As such a silane coupling agent, the same one as described above may be employed.

Further, as the coating composition, one having a monomer or prepolymer of the resin (b) dissolved in a solvent may be prepared, and such a coating composition is applied to the surface of a substrate or the layer (A) and then cured by applying an external energy such as heat, light or electron beam to obtain the layer (B) as a cured film.

In a case where the inorganic substance (c) is used as the layer (B), the layer (B) may be formed by a wet method such as a coating method or a sol gel method, or may be formed by a dry process such as a sputtering method, a vapor deposition method or a CVD method.

Now, a case where a silicon oxide film is to be formed by a wet method, will be described. For example, a method is preferably employed wherein a hydrolyzable silane compound such as a tetraalkoxy silane or an alkyltrialkoxy silane, a partially hydrolyzed condensate of a hydrolyzable silane compound, a polysilazane or the like is dissolved in the above-mentioned protic solvent or aprotic solvent, followed by coating and baking in the atmospheric air to form a silicon oxide film. In a case where a wet method is employed, the method is preferably carried out in a non-aqueous system from the viewpoint of the electret properties. As a film forming method in a non-aqueous system, in a case where a silicon oxide film is to be formed, a method is preferably employed wherein a xylene solution of polysilazane is coated and fired in the atmospheric air to form a silicon oxide film. The firing temperature in this case is preferably from 150° C. to 600° C., more preferably from 180° C. to 450° C. with a view to preventing cracking due to a difference in the linear expansion coefficient from the layer (A).

As the polysilazane in the present invention, a polysilazane or modified polysilazane disclosed in e.g. JP-A-9-31333 or in references disclosed in such publication may be used.

<Laminate>

The laminate in the present invention comprises the directly laminated layers (A) and (B) as the essential constituting units. Further, in the present invention, the layer (B) is disposed on the outermost surface on a side opposite to the side where electric charge is injected at the time of injecting electric charge to the laminate to form an electret. Further, the laminate may have, as the layer (B), a layer (B) disposed at a position other than the outermost surface.

The laminate may be constituted solely by the layers (A) and (B) or may contain another layer. Such another layer may, for example, be a metal layer or an organic monomolecular film layer by e.g. the above-mentioned silane coupling agent. Such a layer can be formed by a conventional method.

From the viewpoint of the film forming process, the laminate is preferably a $(n_A+n_B)$ layered laminate wherein $n_A$ layers of layer (A) and $n_B$ layers of layer (B) are alternately laminated. Here, $n_A$ is an integer of from 1 to 5, $n_B$ is an integer of from 1 to 5, and the value of $n_A-n_B$ is $-1$ or 0. Particularly, $n_A$ is preferably from 1 to 2, $n_B$ is also preferably 1 or 2, and the value of $n_A-n_B$ is preferably 0.

Preferred specific examples of such a laminate may, for example, be a two-layered laminate wherein from a side opposite to the side where electric charge is injected, the layer (B) and the layer (A) are laminated in this order (hereinafter referred to as layer (B)/layer (A), the same applies to other laminates); a three-layered laminate of layer (B)/layer (A)/layer (B); a four-layered laminate of layer (B)/layer (A)/layer (B)/layer (A), etc.

The shape and size of the laminate may suitably be set depending upon the shape and size of the desired electret. An electret is usually employed in the form of a film having a thickness of from 1 to 200 μm, and the laminate is preferably a film having a thickness of from 1 to 200 μm. The thickness of such a laminate is preferably from 3 to 50 μm, particularly preferably from 5 to 20 μm, since such a thickness is advantageous for the processability and the properties as an electret.

Further, in the laminate, the thickness of the layer (B) (thickness per one layer) is preferably at least 0.1 μm, more preferably at least 0.3 μm, most preferably at least 2 μm, whereby the above effect will be excellent. The upper limit of such a thickness is preferably 20 μm, more preferably 10 μm from the viewpoint of the film-forming process and improvement of the surface charge density.

The thickness of the layer (A) (thickness per one layer) is not particularly limited and may be suitably set in consideration of the entire thickness of the laminate, the number of layers (A), etc. In consideration of the charge retention performance, heat resistance, etc. of the electret, it is preferably from 3 to 50 μm, more preferably from 5 to 20 μm.

The thickness of each of the layer (A) and the layer (B) as well as the entire thickness of the laminate, can be measured by an optical interferotype film thickness measuring apparatus.

The electret of the present invention can be produced by a process which comprises a step of forming the above laminate on a substrate so that the layer (B) is in contact directly with the substrate (laminate-forming step) and a step of injecting electric charge to the laminate from a side opposite to the substrate side to form an electret (electric charge-injection step).

In the laminate-forming step, the laminate can be formed by sequentially laminating a layer (B) and a layer (A) on a substrate so that the layer (B) will be in contact directly with the substrate. For example, a double layered laminate can be formed by firstly forming a layer (B) on a substrate and then laminating a layer (A) on the layer (B). Further, in the case of a at least three-layered laminate, by laminating a layer (B) and a layer (A) sequentially and alternately depending upon the desired number of laminated layers, from the substrate side, it is possible to form a laminate having a desired number of laminated layers. At that time, another layer may optionally be laminated, but the laminate contains a laminate wherein at least a layer (A) and a layer (B) are directly laminated. And, the layer (B) is disposed on the outermost surface on a side opposite to the side where electric charge is injected.

As the substrate, it is possible to employ a substrate which can be connected to earth when electric charge is injected to the obtained laminate, without selecting the material. As a preferred material, a conductive metal such as gold, platinum, copper, aluminum, chromium or nickel may be mentioned. Further, a material other than a conductive metal, such as an inorganic material of e.g. glass or an insulating material such as polyethylene terephthalate, polyimide, polycarbonate or an acrylic resin may also be used as the substrate so long as it is one having its surface coated with a metal film by a method such as sputtering, vapor deposition or wet coating. Further, a semiconductor material such as silicon may also be used as a substrate so long as it is one having a similar surface treatment applied, or the ohmic value of the semiconductor material itself is low. The ohmic value of the substrate material is preferably at most 0.1 Ωcm, particularly preferably at most 0.01 Ωcm, by volume resistivity.

Such a substrate may be a flat plate having a smooth surface or one having convexoconcave formed thereon. Otherwise, it may have patterning applied in various shapes. Particularly in a case where the above-mentioned insulating substrate is employed, a pattern or convexoconcave may be formed on the insulating substrate itself, or a pattern or convexoconcave may be formed on a metal film coated on the surface.

As a method for forming a pattern or convexoconcave on the substrate, a conventional method may be employed without any particular restriction. As the method for forming a pattern or convexoconcave, either a vacuum process or a wet process may be employed. As specific examples of such a method, a vacuum process may, for example, be a sputtering method via a mask or a vapor deposition method via a mask, and a wet process may, for example, be a roll coater method, a casting method, a dipping method, a spin coating method, a casting-on-water method, a Langmuir.Blodgett method, a die coating method, an ink jet method or a spray coating method. Otherwise, it is possible to employ a printing technique such as a relief printing method, a gravure printing method, a lithography method, a screen printing method or a flexo printing method. Further, as a method for forming a fine pattern or convexoconcave, a nanoimprinting method or a photolithography method may, for example, be employed.

As a method for laminating the layers (A) and (B) as well as another layer, film forming by the above-described coating method or the like may simply be repeated, or during repetition of the film forming, surface treatment may be applied to the undercoating.

As such surface treatment, it is possible to employ a method of applying the above-mentioned silane coupling agent or a method of roughening or presenting hydrophilicity to the surface by plasma treatment.

In the case of applying the silane coupling agent, such surface treatment can be carried out by dissolving the above-mentioned silane coupling agent in the above-mentioned protic solvent, aprotic solvent or protic fluorinated solvent, followed by coating by the same coating method as described above.

Further, in the case of roughening or presenting hydrophilicity to the surface by plasma treatment, it is possible to employ plasma treatment using a gas such as oxygen, nitrogen, argon, methane, $CHF_3$ or $CF_4$. Such gases may be used alone or in suitable combination as a mixture. In such plasma treatment, to minimize the decrease of the underlayer film thickness, it is preferred to employ oxygen, nitrogen, argon, methane gas or a gas mixture thereof.

In a case where a low resistance substrate such as a copper substrate or a low resistance silicon substrate is used as the substrate, it is possible to inject electric charge to the laminate to form an electret without removing, from the substrate, the laminate formed on the substrate, as described hereinafter.

As described above, in the laminate prepared by sequentially laminating the layer (B) and the layer (A) on the substrate, the layer (B) is in contact with the substrate. Therefore, at the time of injecting electric charge to the laminate on the substrate to form an electret as mentioned above, the layer (B) is disposed on the outermost surface on a side opposite to the side where electric charge is injected, of the laminate. As the layer (B) is so disposed, the effects of the present invention can be sufficiently obtained.

Further, one disposed on the outermost surface on the side where electric charge is injected, of the laminate, may be the layer (A) or the layer (B). It is preferred that the layer (A) is disposed on the outermost surface on the side where electric charge is injected, of the laminate, since the effects of the present invention will be thereby excellent.

In the electric charge injection step, as a method for injecting electric charge to the laminate, it is usually possible to employ any method so long as it is a method to charge an insulator. For example, it is possible to use a corona discharge method, an electron beam bombardment method, an ion beam bombardment method, a radiation method, a light irradiation method, a contact charging method or a liquid contact charging method, as disclosed in G. M. Sessler, Electrets Third Edition, p. 20, Chapter 2.2, "Charging and Polarizing Methods" (Laplacian Press, 1998). Especially, for the electret of the present invention, it is preferred to employ a corona discharge method or an electron beam bombardment method.

Further, as a temperature condition at the time of injecting electric charge, it is preferred to carry out the injection at a temperature of at least the glass transition temperature of the resin (a) from the viewpoint of the stability of electric charge maintained after the injection, and it is particularly preferred to carry out the injection under a temperature condition of about the glass transition temperature+from 10 to 20° C. Further, the voltage to be applied at the time of injecting electric charge is preferably high so long as it is lower than the dielectric breakdown voltage of the laminate. The voltage applied to the laminate in the present invention is from 6 to 30 kV, preferably from 8 to 15 kV in the case of positive charge, and it is from −6 to −30 kV, preferably from −8 to −15 kV in the case of negative charge. The resin (a) is capable of maintaining a negative electric charge more stably than a positive electric charge, and accordingly, it is further preferred to apply a voltage of from −8 to −15 kV.

After injection of the electric charge, the electret may be used as it is together with the substrate for an electrostatic induction conversion device, or it may be removed from the substrate and then used for an electrostatic induction conversion device.

The electret of the present invention is suitable as an electrostatic induction conversion device to convert electric energy to kinetic energy.

Such an electrostatic induction conversion device may, for example, be a vibration-type power-generating unit, an actuator or a sensor. The structure of such an electrostatic induction conversion device may be the same as a conventional one except that as the electret, the electret of the present invention is used.

As compared with conventional electrets, the electret of the present invention is capable of making the surface voltage high even when the thickness of the portion (the above layer (A)) to play a role for charge retention as an electret is thin. Further, the thickness of each of the layers (A) and (B) may be thin, and thus, it is possible to reduce or eliminate non-uniformity of the film thickness at the time of film formation by e.g. coating. It is thereby possible to eliminate non-uniformity of the surface voltage of the electret, and it is possible to obtain an electret film which is substantially free from fluctuation in the electric charge and which has a high surface voltage.

Therefore, the electrostatic induction conversion device using such an electret has an improved efficiency for conversion between electric energy and kinetic energy and exhibits an excellent performance.

The reason as to why such effects can be obtained, is not clearly understood, but it may be explained as follows. That is, in the electret of the present invention, the layer (B) contains a material (the resin (b) or inorganic substance (c)) which is different from the resin (a) having a high charge retention property as an electret and thus is considered to have a relatively low charge retention property. Such a layer (the layer (B)) having a no charge retention property is inserted between a layer (the layer (A)) playing a role for charge retention as an electret and a low resistance (highly conductive) substrate. As a result, the layer (A) is not in contact directly with the substrate, whereby it is considered possible to prevent attenuation of electric charge through the substrate and to maintain electric charge sufficiently even if the thickness of the layer (A) is thin.

EXAMPLES

Now, specific cases of the above embodiment will be described as Examples. However, it should be understood that the present invention is by no means restricted to the following Examples.

Further, in each of the following Examples, as a substrate to form an electret, a low resistance silicon substrate (volume resistivity of from 0.003 to 0.007 Ωcm; in the following Examples, such a substrate is referred to as a "silicon substrate") or a copper substrate was used.

Further, in each of the following Examples, for the measurement of the thickness of each layer was carried out by using optical interferotype film thickness measuring apparatus C10178 manufactured by Hamamatsu Photonics K.K.

Preparation Example 1

Preparation of Polymer Composition Solution M1

(1) Preparation of Polymer Solution 45 g of perfluorobutenyl vinyl ether ($CF_2$=$CFOCF_2CF_2CF$=$CF_2$), 240 g of deionized water, 16 g of methanol and 0.2 g of diisopropylperoxy dicarbonate powder ((($CH_3$)$_2$CHOCOO)$_2$) as a polymerization initiator, were introduced into a pressure resistant glass autoclave having an internal capacity of 1 L. The interior of the system was replaced three times with nitrogen, and then, suspension polymerization was carried out at 40° C. for 23 hours. As a result, 40 g of polymer A1 was obtained. The infrared absorption spectrum of this polymer was measured, whereby absorption in the vicinity of 1,660 $cm^{-1}$ or 1,840 $cm^{-1}$ attributable to the double bond present in the monomer, was not detected.

Polymer A1 was subjected to heat treatment at 250° C. for 8 hours in air and then immersed in water to obtain polymer A2 having —COOH groups as terminal groups. The infrared absorption spectrum of a compression-molded film of the polymer was measured, whereby the characteristic absorption at 1,775 and 1,810 $cm^{-1}$ attributable to —COOH groups was observed. Further, the intrinsic viscosity [η] (30° C.) of this polymer was 0.24 dl/g.

The volume resistivity of polymer A2 was >$10^{17}$ Ωcm, the dielectric breakdown voltage was 19 kV/mm, and the relative dielectric constant was 2.1.

With respect to polymer A2, the differential scanning calorimetry (DSC) was carried out, whereby the glass transition temperature (Tg) of polymer A2 was 108° C.

In a perfluorotributylamine, the above polymer A2 was dissolved at a concentration of 15 mass % to obtain a polymer solution P1.

(2) Incorporation of Silane Coupling Agent

A solution having 10.6 g of perfluorotributylamine added to 84.6 g of the above polymer solution P1, and a silane coupling agent solution having 0.4 g of γ-aminopropylmethyldiethoxysilane dissolved in 4.7 g of 2-(perfluorohexyl)ethanol, were mixed to obtain a uniform polymer composition solution M1.

Example 1

Production of Electret A

On a silicon substrate of 3 cm×3 cm having a thickness of 350 μm, an N-methylpyrrolidone (NMP) solution containing 12 mass % of a polyamic acid (Semicofine SP483, manufactured by Toray Industries, Inc., glass transition temperature: at least 350° C.) was applied by a spin coating method, followed by heat treatment at 200° C. for 5 hours for polyimidation thereby to form a coating film having a thickness of 5 μm (hereinafter referred to as a polyimide film). Then, on the polyimide film, the polymer composition solution M1 was applied by a spin coating method, followed by drying by baking at 200° C., to obtain a laminate film A having a total film thickness of 10 μm and having a smooth surface [double layered laminate having 5 μm of layer (B)/5 μm of layer (A) laminated in this order from the substrate side].

To the obtained laminate film A, electric charge was injected by corona discharge to obtain an electret A. The injection of electric charge was carried out by using a corona charging equipment, of which a schematic construction diagram is shown in FIG. 1, by the following procedure under a condition of 120° C. at a charging voltage of −8 kV for a charging time of 3 minutes. That is, by using a substrate (a silicon substrate in this Example) (10) as an electrode, a high voltage of −8 kV was applied between a corona needle (14) and the substrate (10) by a DC high voltage power source (12) (HAR-20R5, manufactured by Matsusada Precision Inc.) to inject electric charge to the laminate (11) formed on the substrate (10). In this corona charging equipment, negative ions discharged from the corona needle (14) are homogenized by a grid (16) and then showered down on the laminate (11), whereby electric charge is injected. Here, to the grid (16), a voltage of −600 V is applied from the power source (18) for grid.

Example 2

Production of Electret B

On a copper substrate of 3 cm×3 cm having a thickness of 350 μm, a polyimide film having a thickness of 5 μm was formed in the same manner as in Example 1. Then, on the surface of the polyimide film, the polymer composition solution M1 was applied in a film thickness of 10 μm by a spin coating method in the same manner as in Example 1, to obtain a laminate film B having a total film thickness of 15 μm and having a smooth surface [double layered laminate having 5 μm of layer (B)/10 μm of layer (A) laminated in this order from the substrate side].

To the obtained laminate film B, electric charge was injected by the same procedure as in Example 1 to obtain an electret B.

Example 3

Production of Electret C

On a silicon substrate of 3 cm×3 cm having a thickness of 350 μm, a polyimide film having a thickness of 0.3 μm was formed in the same manner as in Example 1. Then, on the surface of the polyimide film, the polymer composition solution M1 was applied in a film thickness of 14.7 μm by a spin coating method in the same manner as in Example 1 to obtain a laminate C having a total film thickness of 15 μm [double layered laminate having 0.3 μm of layer (B)114.7 μm of layer (A) laminated in this order from the substrate side].

To this laminate film C, electric charge was injected by the same procedure as in Example 1 to obtain an electret C.

Example 4

Production of Electret D

On a silicon substrate of 3 cm×3 cm having a thickness of 350 μm, a xylene solution containing 20 mass % of polysilazane (DEN-3, manufactured by Clariant) was applied by a spin coating method, followed by firing at 200° C. for 12 hours to form a silicon oxide film in a film thickness of 2.2 μm on the substrate. Then, the polymer composition solution M1 was applied in a film thickness of 12.8 μm by a spin coating method in the same manner as in Example 1 to obtain a laminate film D having a total film thickness of 15 μm and a substantially smooth surface [double layered laminate having 2.2 μm of layer (B)/12.8 μm of layer (A) laminated in this order from the substrate side].

To this laminate film D, electric charge was injected by the same procedure as in Example 1 to obtain an electret D.

Example 5

Production of Electret E

On a silicon substrate of 3 cm×3 cm having a thickness of 350 μm, a m-xylene solution containing 10 mass % of polycarbonate (LEXAN, manufactured by General Electric Company, glass transition temperature: 146° C.) was applied by a spin coating method, followed by drying by baking at 160° C. for one hour to form a polycarbonate film in a film thickness of 5 μm on a substrate. Then, the polymer composition solution M1 was applied in a film thickness of 10 μm by a spin coating method in the same manner as in Example 1 to obtain a laminate film E having a total film thickness of 15 μm and having a substantially flat surface [double layered laminate having 5 μm of layer (B)/10 μm of layer (A) laminated in this order from the substrate side].

To this laminate film E, electric charge was injected by the same procedure as in Example 1 to obtain an electret E.

Comparative Example 1

Production of Electret F (In a case where cycloolefin polymer is used for layer (B))

On a silicon substrate of 3 cm×3 cm having a thickness of 350 μm, a m-xylene solution containing 15 mass % of a cycloolefin polymer (ZEONEX 480, manufactured by ZEON CORPORATION, relative dielectric constant: 2.3, glass transition temperature: 138° C.) was applied by a spin coating method, followed by drying by baking at 160° C. for one hour to form a coating film having a thickness of 5 μm. Then, the polymer composition solution M1 was applied in a film thickness of 5 μm by a spin coating method in the same manner as in Example 1 to obtain a laminate film F having a total film thickness of 10 μm and having a smooth surface [double layered laminate having 5 μm of layer (B)15 μm of layer (A) laminated in this order from the substrate side].

To this laminate film F, electric charge was injected by the same procedure as in Example 1 to obtain an electret F.

Comparative Example 2

Production of Electret G

In perfluorotributylamine, the polymer A2 in Preparation Example 1 was dissolved at a concentration of 25 mass % to obtain a polymer solution P2. A solution having 1.1 g of perfluorotributylamine added to 27.6 g of the polymer solution P2 and a silane coupling agent solution having 0.2 g of γ-aminopropylmethyldiethoxysilane dissolved in 1.2 g of 2-(perfluorohexyl)ethanol were mixed to obtain a uniform polymer composition solution M2.

On a silicon substrate of 3 cm×3 cm having a thickness of 350 μm, the polymer composition solution M2 was applied by a spin coating method, followed by drying by baking at 200° C. to form a coating film G having a thickness of 15 μm. The coating film G had many non-uniform portions as compared with the above laminate films A to E and was a film having a low surface smoothness.

To this laminate film G, electric charge was injected by the same procedure as in Example 1 to obtain an electret G.

Comparative Example 3

Production of Electret H

On a silicon substrate of 3 cm×3 cm having a thickness of 350 μm, the polymer composition solution M1 as used in Example 1 was applied by a spin coating method, followed by drying by baking at 200° C. to form a coating film H having a thickness of 10 μm. The coating film H had a substantially smooth surface.

To this coating film H, electric charge was injected by the same procedure as in Example 1 to obtain an electret H.

Comparative Example 4

Production of Electret I

On a silicon substrate of 3 cm×3 cm having a thickness of 350 μm, the polymer composition solution M1 as used in Example 1 was applied by a spin coating method, followed by drying by baking at 200° C. to form a coating film I having a thickness of 5 μm. The coating film I had a smooth surface.

To this coating film I, electric charge was injected by the same procedure as in Example 1 to obtain an electret I.

Comparative Example 5

Production of Electret J

On a silicon substrate of 3 cm×3 cm having a thickness of 350 μm, the polymer composition solution M1 as used in Example 1 was applied by a spin coating method, followed by drying by baking at 200° C. to form a coating film J having a thickness of 3 μm. The coating film J had a smooth surface.

To this coating film J, electric charge was injected by the same procedure as in Example 1 to obtain an electret J.

Comparative Example 6

Production of Electret K

On a silicon substrate of 3 cm×3 cm having a thickness of 350 μm, a polyimide film (coating film K) having a thickness of 15 μm was formed in the same manner as in Example 1. The coating film K had many non-uniform portions and was a film having a low surface smoothness.

To this coating film K, electric charge was injected by the same procedure as in Example 1 to obtain an electret K.

Comparative Example 7

Production of Electret L

On a silicon substrate of 3 cm×3 cm having a thickness of 350 μm, a silicon oxide film (coating film L) having a thickness of 3 μm was formed in the same manner as in Example 4. The coating film L had a smooth surface.

To this coating film L, electric charge was injected by the same procedure as in Example 1 to obtain an electret L.

Comparative Example 8

Production of Electret M

On a silicon substrate of 3 cm×3 cm having a thickness of 350 μm, a polycarbonate film (coating film M) having a thickness of 5 μm was formed in the same manner as in Example 5. The coating film M had a smooth surface.

To this coating film M, electric charge was injected by the same procedure as in Example 1 to obtain an electret M.

Comparative Example 9

Production of Electret N

On a silicon substrate of 3 cm×3 cm having a thickness of 350 μm, a cycloolefin polymer film (coating film N) having a thickness of 15 μm was formed in the same manner as in Comparative Example 1. The coating film N had many non-uniform portions and was a film having a low surface smoothness.

To this coating film N, electric charge was injected by the same procedure as in Example 1 to obtain an electret N.

Test Example 1

Charging Test

With respect to the electrets A to N obtained as described above, charging tests were carried out by the following procedure.

The electrets A to N immediately after injecting electric charge by corona charging under conditions of a charging voltage of −8 kV and a charging time of 3 minutes, were, respectively, returned to room temperature (25° C.), and their surface voltages (initial surface voltages) were measured. Further, the respective electrets were stored for 200 hours under conditions of 20° C. and 60% RH and then returned to room temperature, and their surface voltages (surface voltages after 200 hours) were measured. The results are shown in Table 1.

Figure 2:
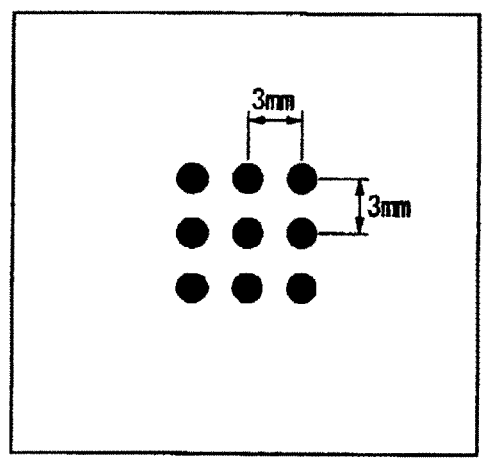
FIG. 2 is a diagram showing set positions for measuring points for surface voltages.

The surface voltage (V) was obtained by measuring surface voltages at 9 measuring points (set in a lattice arrangement for every 3 mm from the center of the film, as shown in FIG. 2) of each electret by using a surface voltmeter (model 279, manufactured by Monroe Electronics Inc.), and taking their average value.

TABLE 1

| Electret | Film thickness of layer (A) (μm) | Film thickness of layer (B) (μm) | Total film thickness (μm) | Surface voltage (V) Initial | After 200 hours |
|---|---|---|---|---|---|
| A | 5 | 5 | 10 | −1,374 | −1,306 |
| B | 10 | 5 | 15 | −1,526 | −1,375 |
| C | 14.7 | 0.3 | 15 | −1,418 | −1,327 |
| D | 12.8 | 2.2 | 15 | −1,450 | −1,410 |
| E | 10 | 5 | 15 | −1,338 | −1,303 |
| F | 5 | 5 | 10 | −1,100 | −800 |
| G | 15 | — | 15 | −1,277 | −1,274 |
| H | 10 | — | 10 | −1,239 | −1,234 |
| I | 5 | — | 5 | −705 | −576 |
| J | 3 | — | 3 | −510 | −357 |
| K | — | 15 | 15 | −771 | 0 |
| L | — | 3 | 3 | −171 | −118 |
| M | — | 5 | 5 | −175 | −104 |
| N | 15 | — | 15 | −872 | −743 |

From the results in Table 1, judging from the surface voltages at the initial stage and after 200 hours, electret A showed an improvement in the surface voltage and surface charge density over electrets F and H, although the total film thickness was the same.

Further, electrets B to E showed an improvement in the surface voltage over the electrets G, K and N although the total film thickness was the same.

Further, electrets K, L and M were electrets having low electric charge retention and charge stability as compared with electrets G, J and I each having the same film thickness.

Further, electret N was an electret having low electric charge retention but equal charge stability as compared with electret G.

INDUSTRIAL APPLICABILITY

The electret of the present invention is capable of increasing the surface voltage, and an electrostatic induction conversion device using such an electret has an improved efficiency for conversion between electric energy and kinetic energy and thus is useful for e.g. a vibration type power generator, an actuator, a censor, etc. having excellent performance.

The entire disclosure of Japanese Patent Application No. 2008-107717 filed on Apr. 17, 2008 including specification, claims, drawings and summary is incorporated herein by reference in its entirety.

MEANINGS OF SYMBOLS

10: copper substrate, 11: coating film, 12: DC high-voltage power source, 14: corona needle, 16: grid, 17: ammeter, 18: power source for grid, 19: hot plate

What is claimed is:

1. An electret disposed on a substrate comprising a laminate of directly laminated layers of alternating layer types (A) and (B), wherein layer type (A) comprises a resin (a) and layer type (B) comprises a resin (b) other than the resin (a), wherein the resin (a) is an amorphous fluororesin having an alicyclic structure;

wherein a layer of layer type (B) is disposed on a side of the electret opposite to the side where electric charge is injected at the time of injecting electric charge into the laminate to form the electret;

wherein layer type (A) has a thickness in the range of 5 to 20 µm;

wherein layer type (B) has a thickness in the range of 0.1 to 20 µm;

wherein the electret, not including the substrate, has a total thickness in the range of 5.1 to 20 µm;

wherein the laminate comprises a structure selected from the group consisting of (i) a layer of type (A) which overlays a layer of type (B) which, in turn, overlays the substrate;

(ii) a first layer of type (B) which overlays a layer of type (A) which, in turn, overlays a second layer of type (B) which, in turn, overlays the substrate; and (iii) a first layer of type (A) which overlays a first layer of type (B), which, in turn, overlays a second layer of type (A), which, in turn, overlays a second layer of type (B), which, in turn, overlays the substrate;

wherein the resin (b) is at least one member selected from the group consisting of a polyimide, a polyparaxylylene resin, a polycarbonate, a polyarylene, a polyarylene ether, a polyether, a polyether sulfone, a polyether ketone, a polyether nitrile, a polyether imide, a polyarylenethioether, a polythioether sulfone, a polysulfone, nylon, a polyester, a polystyrene, a polyethylene, a polypropylene, a polyketone, an epoxy resin, an acrylic resin, a polyurethane and an aramid resin; and wherein the layers of alternating layer types (A) and (B) are separately applied layers.

2. The electret according to claim 1, wherein the resin (b) has a glass transition temperature or melting point of at least 80° C.

3. The electret according to claim 1, wherein the resin (b) is a polyimide.

4. An electrostatic induction conversion device comprising the electret as defined in claim 1.

5. The electret of claim 1, wherein the laminate has the structure (i) a layer of type (A) which overlays a layer of type (B) which overlays the substrate.

6. The electret of claim 1, wherein the laminate has the structure (ii) a first layer of type (B) which overlays a layer of type (A) which overlays a first layer of type (B) which overlays the substrate.

7. The electret of claim 1, wherein the electret has the structure (iii) a first layer of type (A) which overlays a first layer of type (B) which overlays a second layer of type (A) which overlays a second layer of type (B) which overlays the substrate.

* * * * *